(12) United States Patent
Asher et al.

(10) Patent No.: US 6,414,043 B1
(45) Date of Patent: *Jul. 2, 2002

(54) HYDROGEL MATERIALS WITH CRYSTALLINE COLLOIDAL ARRAY OF WATERVOIDS FOR DETECTION AND MACROMOLECULE SEPARATIONS

(75) Inventors: Sanford A. Asher; Lei Liu, both of Pittsburgh, PA (US)

(73) Assignee: University of Pittsburgh, Pittsburgh, PA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/344,741

(22) Filed: Jun. 25, 1999

Related U.S. Application Data

(60) Provisional application No. 60/090,885, filed on Jun. 26, 1998.

(51) Int. Cl.$^7$ .................................................. C08J 9/26
(52) U.S. Cl. ........................... 521/61; 521/64; 521/142; 521/150; 521/183
(58) Field of Search ........................... 521/183, 64, 61, 521/142, 150

(56) References Cited

U.S. PATENT DOCUMENTS

| | | |
|---|---|---|
| 4,627,689 A | 12/1986 | Asher |
| 4,632,517 A | 12/1986 | Asher |
| 5,281,370 A | 1/1994 | Asher et al. |
| 5,452,123 A | 9/1995 | Asher et al. |
| 5,711,884 A | 1/1998 | Asher et al. |
| 5,737,102 A | 4/1998 | Asher |
| 5,898,040 A | * 4/1999 | Shalaby et al. ............. 521/183 |

FOREIGN PATENT DOCUMENTS

| | | |
|---|---|---|
| EP | 0412507 | 8/1990 |
| WO | 9819787 | 5/1998 |

OTHER PUBLICATIONS

Jacoby, M., "Photonic Crystals: Whole Lotta Holes", *C&EN*, 38–43, (Nov. 23, 1998).
Liu, L. and Asher, S., *J. Am. Chem. Soc.*, 119, 2729–2731 (1997).
Liu, L. and Asher, S., "Periodic Mesoscopic 'Traps' for Macromolecules", Abstract, Presented at The Seventy–First Colloid & Surface Science Symposium, University of Delaware, Newark, Delaware (Jul. 30, 1997).
Holtz, J.H. and Asher, S.A., *Nature*, 389, 829–832 (1997).
Pan, G. et al., *Phys. Rev. Lett.*, 78, 3860–3863 (1997).
Rousseau J. et al., *Phys. Rev. Lett.*, 79, 1945–1948 (1997).
Sheu, W.S. et al., *J. Chem. Phys.*, 106, 9050–9056 (1997).
Slater, G.W. et al., *Phys. Rev. Lett.*, 78, 1170–1173 (1997).
Nixon, G.I. and Slater, G.W., *Phys. Rev. E.*, 53, 4969–4980 (1996).
Weissman, J.M. et al., *Science*, 274, 959–960 (1996).
Righetti, P.G., *J. Chromatogr. A*, 698, 3–17 (1995).
Slater, G.W. and Wu, S.Y., *Phys. Rev. Lett.*, 75 164–167 (1995).
Volkmuth, W.D. et al., *Phys. Rev. Lett.*, 72, 2117–2120 (1994).
Mayer, P. et al., *Appl. Theoret. Electrophoresis*, 3, 147–155 (1993).
Kesavamoorthy, R. et al., *J. Colloid Interface Sci.*, 153, 188–198 (1992).
Rotstein, N.A. and Lodge, T.P., *Macromolecules*, 25, 1316–1325 (1992).
Hoagland, D.A. and Muthukumar, M., *Macromolecules*, 25, 6696–6698 (1992).
Zwanzig, R., *J. Phys. Chem.*, 96, 3926–3930 (1992).
Arvanitidou, E. and Hoagland, D., *Phys. Rev. Lett.*, 67, 1464–1466 (1991).
Monovoukas, Y. and Gast, A.P., *Langmuir*, 7, 460–468 (1991).
Nemoto, N. et al., *Macromolecules*, 23, 659–664 (1990).
Smisek, D.L. et al., *Science*, 248, 1221–1223 (1990).
Davis, K.E. et al., *Science*, 245, 507–510 (1989).
Muthukumar, M. and Baumgartner, A., *Macromolecules*, 22, 1941–1946 (1989).

(List continued on next page.)

*Primary Examiner*—John M. Cooney, Jr.
(74) *Attorney, Agent, or Firm*—Baker Botts LLP

(57) ABSTRACT

A method of making a novel composition of a porous medium comprising volume elements of both voids and pores wherein the voids are much larger than the mean size of the pores. The method includes a first step of preparation of a porous medium comprising solid particles the approximate size selected for the voids and pores as volume elements and a second step of removing the particles by etching out with hydrofluoric acid or other means to form a porous medium comprising both voids and pores. In another embodiment, the voids are prepared from Bow etching out of a polymeric hydrogel silica particles which were allowed to self-assemble as a crystalline colloidal array prior to formation of the polymeric hydrogel around them, thereby forming a porous medium containing a crystalline colloidal array of voids containing aqueous solution. In another embodiment, a method of partitioning macromolecules between a solution comprising the macromolecules, and the voids and pores of a porous medium. The method includes partitioning of macromolecules between voids, pores and the adjacent solution as used in chromatography, electrophoresis, filtration, extraction, other separation process, drug delivery devices, timed-release devices, and semi-homogeneous catalytic reactors. In another embodiment, a method of using Bragg diffraction for detection and monitoring partitioning of macromolecules in the voids comprised in a porous medium comprising a crystalline colloidal array of voids which are much larger than the mean pore size of the medium.

29 Claims, 15 Drawing Sheets

OTHER PUBLICATIONS

Carmesin, I. and Kremer, K., *Macromolecules,* 21, 2819–2823 (1988).

Zimm, B.H., *Phys. Rev. Lett.,* 61, 2965–2965 (1988).

Baumgartner, A. and Muthukumar, M.*J. Chem. Phys.,* 87, 3082–3088 (1987).

Kim, H. et al., *Macromolecules,* 19, 2737–2744 (1986).

Guillot, G. et al., *Macromolecules,* 18, 2531–2537 (1985).

Clark, N.A. et al., *Nature,* 281, 57–60 (1979).

Daoudi, S. and Brochard, F., *Macromolecules,* 11, 751–758 (1978).

Brochard, F. and De Gennes, P.G.,*J. Chem. Phys.,* 67, 52–56 (1977).

Daoud, M. and DeGennes, P.G., *J. Phys. (Les Ulis, Fr.),* 38, 85–93 (1977).

Casassa, E.F. and Tagami, Y., *Macromolecules,* 2, 14–26 (1969).

Hiltner, P.A. and Krieger, L.M., *J. Phys. Chem.,* 73, 2386–2389 (1969).

Casassa, E.F., *Polymer Lett.,* 5, 773–778 (1967).

Asher et al., Self Assembly Motif for Creating Submicron Periodic Materials. Polymerized Crystalline Colloidal Arrays, *J. Am. Chem. Soc.,* 116, 4997 (1994).

Noolandi, J. et al., Self–Tapping and Anomalous Dispersion of DNA in Electrophoresis, *Phys. Rev. Lett.,* 58, (23), 2428 (1987).

\* cited by examiner

Bragg diffraction probes the chemical composition of HPCCA. Top: Experimental schematics. Bottom: Measured Bragg diffraction spectra from HPCCA film before (a) and after (b) exchange in NaPSS solution.

Molecular weight dependence of the NaPSS partition coefficient at 5% (w/w) reservoir concentration. $K_{HG}$ is the ratio of the NaPSS weight percent concentration in the voids over that in the gel medium.

US 6,414,043 B1

HYDROGEL MATERIALS WITH CRYSTALLINE COLLOIDAL ARRAY OF WATERVOIDS FOR DETECTION AND MACROMOLECULE SEPARATIONS

This application claims the benefit of the filing date of and incorporates herein by reference the prior filed provisional patent application serial number 60/090,885 with a filing date of Jun. 26, 1998.

This invention was made with government support under (a) Contract N00014-94-1-0592 awarded by the United States Office of Navel Research, (b) Grant No. CHE-9633561 from the National Science Foundation, and (c) Grant No. AFOSR-91-0441 from the Air Force Office of Science Research. The government has certain rights in the invention.

BACKGROUND OF INVENTION

The present invention generally concerns compositions comprising pores (interstitial spaces) and voids wherein the voids are much larger than the mean pore size, optionally with the voids arranged in crystalline colloidal arrays (CCA) of spherical water voids (HCCA); methods of making said compositions; and methods of using the compositions to partition macromolecules. Preferably these compositions comprise hydrogels and preferably the voids are monodisperse. The size, number density, periodicity, and morphology of these voids can be well controlled by tailoring the original colloids. Because the voids are much larger than the mean size of the hydrogel pores, the hydrogel voids can serve as entropic traps. Flexible macromolecules such as linear polymers, proteins and nucleic acid fragments that may be present in these materials preferentially partition in the embedded voids, since they can maximize their chain conformational freedom, and thus their conformational entropy. As a result, flexible macromolecules will be entrapped preferentially in the designed voids rather than the rest of the hydrogel matrix. This entropic trapping strongly depends upon the size of the macromolecules, the voids, and the mean dimension of the hydrogel network.

The partitioning of a flexible polymer chain, such as a protein, between different volume elements (i.e., voids and pores) of a porous medium is important in areas such as size exclusion chromatography, gel electrophoresis, filtration, membrane separation, in controlled released drugs and other materials, and semi-homogeneous catalytic reactors in synthetic applications. Although intrinsically a thermodynamic phenomenon, such partitioning often plays an important role in many dynamic processes such as diffusion and electrophoretic migration of polymer chains through porous media. See, Nemoto, N., Kishine, M., Inoue, T., Osali, K., *Macromolecules*, 1990, 23, 659–664; Kim, H., Chang, T., Yohanan, J. M., Wang, L., Yu, H., *Macromolecules*, 1986, 19, 2737–2744; Smisek, D. L., Hoagland, D. A., *Science*, 1990, 248, 1221–1223; Arvanitidou, E., Hoagland, D., *Phys. Rev. Lett.*, 1991, 67, 1464–1466; Lodge, T. P., Rotstein, N. A., *Macromolecules*, 1992, 25, 1316–1325; Muthukumar, M., Hoagland, D. A., *Macromolecules*, 1992, 25, 6696–6698, Mayer, P., Slater, G. W., Drouin, G., *Appl. Theoret. Electrophoresis* 1993, 3, 147–155; Rousseau, J., Drouin, G., Slater, G. W., *Phys. Rev. Lett.*, 1997, 79, 1945–1948; Guillot, G., Léger, L., Rondelez, F., *Macromolecules*, 1985, 18, 2531–2537.

In the absence of specific interactions between the polymer chains and the media, it has been suggested that the volume-constrained chain conformational entropy controls the partitioning of flexible polymer chains between regions of different volumes. See Baumgärtner, A., Muthukumnar, M. J., *Chem. Phys.*, 1987, 87, 3082–3088; Muthukumar, M., Baumgärtner, A., *Macromolecules*, 1989, 22, 1937–1941; Muthulcumar, M., Baumgärtner, A., *Macromolecules*, 1989, 22, 1941–1946; Casassa, E. F., *Polymer Left.*, 1967, 5, 773–778; Casassa, E. F., Tagami, Y., *Macromolecules*, 1969, 2, 14–26; Noolandi, J., Rousseau, J., Slater, G. W., *Phys. Rev. Lett.*, 1987, 58, 2428–2431; Slater, C. W., Wu, S. Y., *Phys. Rev. Lett.*, 1995, 75, 164–167; Daoud, M., De Gennes, P. G., *J Phys.* (Les Ulis, Fr.), 1977, 38, 85–93; and Brochard, F., De Gennes, P. G., *J Chem. Phys.*, 1977, 67, 52–56. FIG. 1 illustrates a polymeric gel system where the average network matrix provides only narrow channels 13 where the polymer 10 chain must be elongated; the polymer chain 10 is constrained with only limited conformational possibilities. In contrast, if the polymer chain 16 occupied a large spherical void, 15 it would be able to adopt all of its possible conformations, and would possess a larger conformational entropy. Consequently, the polymer chain should preferentially partition into this large void. From a dynamic point of view, if the polymer chain tries to leave the void, it encounters an entropic barrier since its conformations must be restricted to those which can squeeze into the narrow channels. Thus, ski large voids in a porous medium have been proposed to function as "entropic traps" to retard the diffusion and transportation of flexible polymer chains.

Evidence for this entropic trapping phenomenon has come from experimental studies on diffusion or low field electrophoretic migration of flexible chain polymers, in various types of porous media, such as entangled solutions, crosslinked polymeric gel networks, and model membranes of well-controlled pores. See, Nemoto, N., Kishine, M., Inoue, T., Osaki, K., *Macromolecules*, 1990, 23, 659–664; Kim, H., Chang, T., Yohanan, J. M., Wang, L., Yu, H., *Macromolecules*, 1986, 19, 2737–2744; Smisek, D. L., Hoagland, D. A., *Science*, 1990, 248, 1221–1223; Arvanitidou, E., Hoagland, D., *Phys. Rev. Lett.*, 1991, 67, 1464–1466; Lodge, T. P., Rotstein, N. A., *Macromolecules*, 1992, 25, 1316–1325; Muthulcumar, M., Hoagland, D. A., *Macromolecules*, 1992, 25, 6696–6698, Mayer, P., Slater, G. W., Drouin, G., *Appl. Theoret. Electrophoresis*, 1993, 3, 147–155; Rousseau, J., Drouin, G., Slater, G. W., *Phys. Rev. Lett.*, 1997, 79, 1945–1948; and Guillot, G., Léger, L., Rondelez, F., *Macromolecules*, 1985, 18, 2531–2537. It was observed that, when the equilibrium dimension of the macromolecules was comparable to the mean pore size of the medium and the electric field was weak, the diffusion constant (D) and electrophoretic mobility ($\mu$) depended more strongly on molecular weight than predicted by either Rouse dynamics or a reptation model. This behavior was rationalized by an entropic barrier transport model which was first formally proposed by Muthukumar and co-workers. See, Baumgärtner, A., Muthukumar, M. J., *Chem. Phys.*, 1987, 87, 3082–3088; Muthukumar, M., Baumgärtner, A., *Macromolecules* 1989, 22, 193 7–1941; and Muthukumar, M., Baumgärtner, A., *Macromolecules*, 1989, 22, 1941–1946.

Casassa was the first to calculate, from ideal random walk statistics of chain conformational entropy, the equilibrium partition coefficients of a single polymer chain between confining volumes of different shapes (i.e. spherical, cylindrical, and slabshaped, etc.). See, Casassa, E. F., *Polymer Lett.*, 1967, 5, 773–778; and Casassa, E. F., Tagami, Y., *Macromolecules*, 1969, 2, 14–26. A scaling argument for polymer solutions has been used to investigate both the partitioning and transport properties of self-avoiding polymer chains in good solvents in small cylindrical tubes as a function of concentration ranging from the dilute solution regime to the entanglement regime. See, De Gennes, P. G., *Scaling Concepts in Polymer Physics*, Cornell University Press: Ithaca, N.Y., 1979; Daoud, M., De Gennes, P. G., *J Phys.* (Les Ulis, Fr.), 1977, 38, 85–93; and Brochard, F., De Gennes, P. G., *J Chem. Phys.*, 1977, 67, 52–56.

The dynamics of both non-self-avoiding and self-avoiding polymer chains in various two-dimensional or three-dimensional model porous media have been studied by formalisms such as Monte Carlo methods, see, Baumgärtner, A., Muthukumar, M. J., *Chem. Phys.*, 1987, 87, 3082–3088; Muthukumar, M., Baumgärtner, A., *Macromolecules*, 1989, 22, 1937–1941; Muthukumar, M., Baumgärtner, A., *Macromolecules*, 1989, 22, 1941–1946, biased reptation model, see, Noolandi, J., Rousseau, J., G. W., *Phys. Rev. Lett.*, 1987, 58, 2428–2431; Slater, G. W., Wu, S. Y., *Phys. Rev. Lett.*, 1995, 75, 164–167; Daoud, M., De Gennes, P. G., *J Phys.* (Les Ulis, Fr.), 1977, 38, 85–93; Brochard, F., De Gennes, P. G., *J Chem. Phys.*, 1977, 67, 52–56; Daoudi S., Brochard, F., *Macromolecules*, 1978, 11, 751–758; De Gennes, P. G., *Scaling Concepts in Polymer Physics*. Cornell University Press: Ithaca, N.Y., 1979; Carmesin, I., Kremer, K., *Macromolecules*, 1988, 21, 2819–2823; and Zimi, B. H., *Phys. Rev. Lett.*, 1988, 61, 2965–2968, Brownian dynamics, see, Nixon, G. I., Slater, G. W., *Phys. Rev. E*, 1996, 53, 4969–4980, and bond fluctuation algorithms, see, Carmesin, I., Kremer, K., *Macromolecules*, 1988, 21, 2819–2823, etc. See, Slater, G. W., Wu, S. Y., *Phys. Rev. Lett.*, 1995, 75, 164–167; Volkmuth, W. D., Duke, T., Wu, M. C., Austin, R. H., *Phys. Rev. Lett.*, 1994, 72, 2117–2120; Slater, G. W., Guo, H. L., Niwon, G. L., *Phys. Rev. Lett.*, 1997, 78, 1170–1173; Zwanzig, R., *J Phys. Chem.*, 1992, 96, 3926–3930; and Sheu, W. S., Yang, D. Y., Sheu, S. Y., *J Chem. Phys.*, 1997, 106, 9050–9056. All theoretical attempts so far assume model pores or obstacles with well defined boundary conditions such as a cubic array of square boxes connected by narrow channels, see, Muthulwmar, M., Baumgärtner, A., *Macromolecules*, 1989, 22, 1937–1941, a two dimensional lattice with random obstacles, see, Baumgärtner, A., Muthukumar, M., *J Chem. Phys.*, 1987, 87, 3082–3088; Muthukumar, M., Baumgärtner, A., *Macromolecules*, 1989, 22, 1941–1946; and Slater, G. W., Wu, S. Y., *Phys. Rev. Lett.*, 1995, 75, 164–167, "straits and lakes", see, Zimm, B. H., *Phys. Rev. Lett.*, 1988, 61, 2965–2968, and an infinitely long tube with a periodically oscillating width, see, Nixon, G. I., Slater, G. W., *Phys., Rev. E*, 1996, 53, 4969–4980; Noolandi, J., Rousseau, J., Slater, G. W., *Phys. Rev. Lett.*, 1987, 58, 2428–2431; Volkmuth, W. D., Duke, T., Wu, M. C., Austin, R. H., *Phys. Rev. Lett.*, 1994, 72, 2117–2120; Slater, G. W., Guo, H. L., Nixon, G. L., *Phys. Rev. Lett.*, 1997, 78, 1170–1173; Zwanzig, R., *J Phys. Chem.*, 1992, 96, 3926–3930; and Sheu, W. S., Yang, D. Y., Sheu, S. Y., *J Chem. Phys.*, 1997, 106, 9050–9056.

However, the relevance of any of these approaches to polymer diffusion in a swollen polymeric gel matrix remains unclear. Prior to the present invention, no measurements have been made of the equilibrium partitioning of a flexible chain polymer in a swollen polymeric gel matrix. Quantitative comparisons of theoretical and experimental results have previously been difficult due to the lack of a well-defined pore size, polydispersity, and morphology in typical gel matrices.

Preparation of CCAs has previously been described in U.S. Pat. No. 4,627,689, which discloses a crystalline narrow band radiation filter comprised of a highly ordered crystalline colloidal structure which is formed by dispersing electrically charged particles, for example, polystyrene particles within an appropriate solvent. U.S. Pat. No. 4,632,517 also discloses a narrow wavelength band filtering device created by forming a highly ordered crystalline colloidal structure within a cell. The disclosures of U.S. Pat. Nos. 4,627,689 and 4,632,517 are incorporated herein by reference.

Preparation of both liquid and solid form crystalline colloidal array have been disclosed in U.S. Pat. No. 5,452,123 which describes an optically nonlinear switched optical device comprising an ordered dispersion of charged particles. Preparation of a solid narrow band radiation filter comprising a solid crystalline colloidal assay is disclosed in U.S. Pat. No. 5,711,884. The disclosures of U.S. Pat. Nos. 5,452,123 and 5,711,884 are incorporated herein by reference.

The present invention provides the first direct evidence for equilibrium entropic trapping phenomena in swollen polymeric gel media by utilizing polymerized crystalline colloidal array (PCCA) materials. Crystalline colloidal arrays (CCAs) are three dimensional periodic arrays formed by the self-assembly of monodisperse macroionic colloidal spheres in low ionic strength aqueous solutions. See, Hiltner, P. A., Krieger, L. M., *J Phys. Chem.*, 1969, 73, 2386–2389; Davis, K. E., Russel, W. B., Glantschnig, W. J., *Science*, 1989, 245, 507–5 10; Monovoukas, Y., Gast, A. P., *Langmuir*, 1991, 7, 460–468; Kesavamoorthy, R., Tandon, S., Xu, S., Jagannathan, S., Asher, S. A., *J Colloid Interface Sci.*, 1992, 153, 188–198; Clark, N. A., Hurd, A. J., Ackerson, B. J., *Nature*, 1979, 281, 57–60; Asher, S. A., Jagannathan, S., U S. Pat. No. 5.281.370; Asher, S. A., Holtz, J., Liu, L., Wu, Z. *J. Am. Chem. Soc.*, 1994, 116, 4997–4998; Weissman, J. M., Sunkara, H. B., Tse, A. S., Asher, S. A., *Science* 1996, 274, 959–960; Pan, G., Kesavamoorthy, R., Asher, S. A., *Phys. Rev. Lett.*, 1997, 78, 3860–3863; Holtz, J. H., Asher, S. A., *Nature*, 1997, 389, 829–832; and Liu, L., LI, P., Asher, S. A., *J Am. Chem. Soc.* 1997, 119, 2729–2731. This self-assembly minimizes the total interparticle electrostatic repulsive energy of the system. CCAs adopt either a bodycentered cubic (bcc) or face-centered cubic (fcc) structure, and orient with their highest particle density lattice planes (i.e., bcc (110) or fcc (111) planes) parallel to the container walls, see, Kesavamoorthy, R., Tandon, S., Xu, S., Jagannathan, S., Asher, S. A., *J Colloid Interface Sci.*, 1992, 153, 188–198; and Clark, N. A., Hurd, A. J., Ackerson, B. J., *Nature*, 1979, 281, 57–60. Similar to atomic crystals diffracting x-rays, CCAs strongly Bragg diffract light in the near IR through UV spectral regions. See, Kesavamoorthy, R., Tandon, S., Xu, S., Jagannathan, S., Asher, S. A., *J Colloid Interface Sci.*, 1992, 153, 188–198; Clark, N. A., Hurd, A. J., Ackerson, B. J., *Nature*, 1979, 281, 57–60; Asher, S. A., Jagannathan, S., U S. Pat. No. 5,281,370; Asher, S. A., Holtz, J., Liu, L., Wu, Z. *J Am., Chem. Soc.*, 1994, 116; 49974998; Weissman, J. M., Sunkara, H. B., Tse, A. S., Asher, S. A., *Science* 1996, 274, 959–960; Pan, G., Kesavamoorthy, R., Asher, S. A., *Phys. Rev. Lett.*, 1997, 78, 3860–3863; Holtz, J. H., Asher, S. A., *Nature*, 1997, 389, 829–832; and Liu, L., LI, P., Asher, S. A., *J Am. Chem. Soc.* 1997, 119, 2729–2731. Quantitative models of the dependence of the Bragg diffraction on the CCA structure and optical constants, see Liu, L., LI, P., Asher, S. A., *J Ant. Chem. Soc.* 1997, 119, 2729–2731, have been developed.

SUMMARY OF THE INVENTION

The present invention provides a composition comprising a porous medium containing multiple volume elements, such as voids and pores, wherein the voids are much larger than the pores (interstitial spaces). The voids may be arranged in a crystalline colloidal array or otherwise distributed. The voids and pores may contain water, aqueous solutions, or other liquids.

An aspect of the present invention is a methodology for the preparation of a material comprised of a porous media, such as polymeric hydrogels comprising pores and voids, wherein the voids are much larger than the mean pore size and the pores comprise the interstitial spaces between the polymers comprising the hydrogel. The material may be prepared by fixing particles having the approximate size of the desired voids in the porous medium, for example by polymerizing a hydrogel around the particles and by subsequently removing the particles, for example by etching with hydrofluoric acid, without disrupting the surrounding material thereby producing a porous medium having voids the approximate size of the removed particles.

The present invention also provides a method for separating macromolecules such as proteins, nucleic acids and other polymers including long chain linear polymers, using the composition of the present invention, comprising a step of partitioning the macromolecules between the voids and the pores of the porous medium wherein the greater entropy of certain macromolecules inside the voids compared with the pores causes, at least partially, those certain macromolecules to partition preferentially in the voids. The size of the voids, in comparison with the pores, is selected such that macromolecules have a greater conformational entropy in the voids than in the pores. The size, number density, periodicity and morphology of the voids can all be varied to control the degree of partitioning between voids and pores and to differentiate between macromolecules of different lengths, sizes and weights. For example, a method of separating macromolecules, such as long chain polymers, can use such partitioning to preferentially trap polymers of certain lengths because the increase in conformational entropy, and therefore the degree of partitioning, from pore to void can vary with polymer length and void size. The voids may be arranged in lattice structure thereby allowing the use of Bragg diffraction to measure and monitor the partitioning of the macromolecules between voids and pores.

A method of preparing the composition is herein disclosed in which a crystalline colloidal array of silica spheres is fused by polymeric hydrogel around the array colloids. The silica spheres are then fully etched out of the hydrogel with hydrofluoric acid (HF) leaving a crystalline colloidal array of water voids in the hydrogel.

In another aspect of the invention the method of partitioning macromolecules between voids and pores is applied in methods for chromatography, electrophoresis, filtration, extraction or other separation process. In yet another aspect of the invention the partitioning of macromolecules between the voids and the pores may be useful for trapping and releasing specific biochemical materials for use in drug delivery or other controlled release processes. Further the partitioning of macromolecules provides another aspect of the invention in the use of the inventive material in semi-homogenous catalytic reactors for application in organic, bioengineering, combinatorial and other forms of synthesis.

It is an object of the invention that by tailoring the properties of the original colloids, the size, number density, and morphology of the embedded voids can be continuously selected to prepare compositions specifically designed for the separation of target macromolecules of particular sizes or other characteristics. It is an object of the invention that Bragg diffraction from the voids provides a useful means of optical detection for the monitoring of concentration separation of macromolecules or of physical-chemical processes.

It is an object of the invention, that hydrogels, such as poly-N-isopropyl-acrylamide (PNIPAM) hydrogels, which undergo volume phase transition with changing temperature can provide a porous medium of hydrogel material with water filled voids whose void size may be controlled by temperature. Controlling void size facilitates the control of trapping and releasing processes in separation, transfer and delivery of target macromolecules. The PNIPAM hydrogels swell at low temperature and shrink at higher temperatures thereby allowing control of void size inside a void containing medium comprised of PNIPAM hydrogel.

BRIEF DESCRIPTION OF THE DRAWINGS

FIG. 12 shows the experimental diagram and measured HPCCA diffraction spectra before and after soaking in NaPSS solutions. More uptake of NaPSS chains in the voids than in the gel medium results in a decrease in the refractive index difference between the scatterers and the medium, and results in a decrease in the HPCCA diffraction intensity. The uptake of NaPSS also increases the overall crystal refractive index, and slightly red-shifts the diffracted wavelength.

FIG. 13 shows the molecular weight dependence of the measured NaPSS partition coefficient $K^{HG}$, between the voids and the gel medium. $K_{HG}$ strongly depends upon the NAPSS molecular size. At the largest molecular weight tested, the NAPSS concentration in the voids is—4-fold higher than that in the gel medium.

DETAILED DESCRIPTION OF THE INVENTION

Figure 1A:
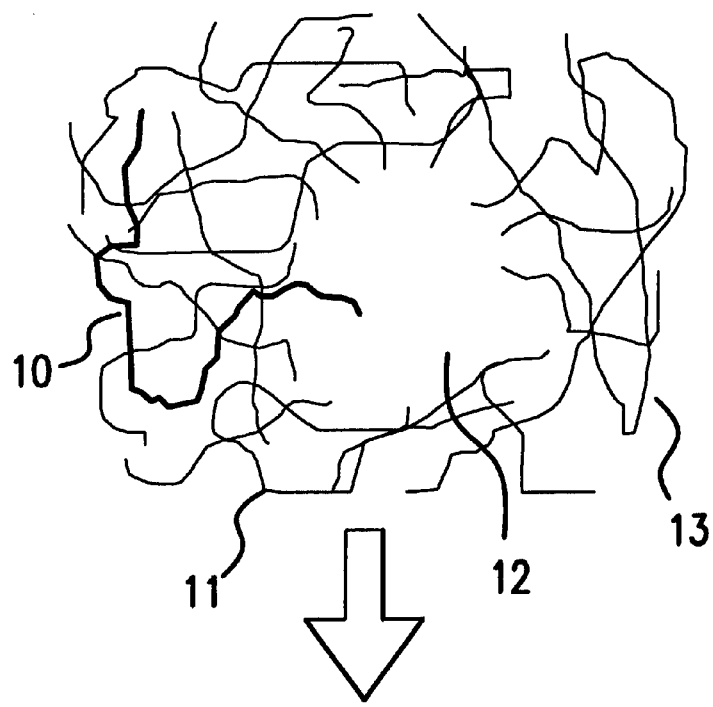
FIG. 1. Illustration of entropic trapping phenomenon. A flexible chain macromolecule 10 is: (a) elongated, with a lower entropy in a region of high spatial constraints 13 in the pores of a porous medium, (b) relaxed and folded in a region of low spatial constraints 15, a void in a porous medium.
Figure 1B:
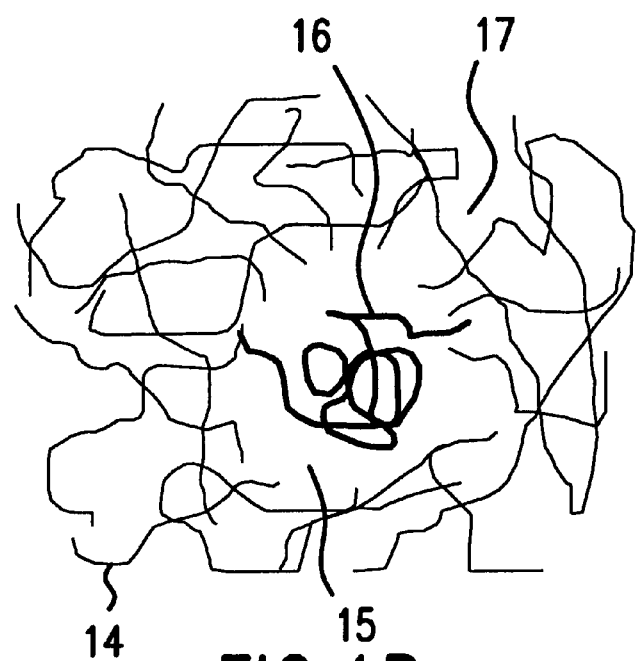

Although not to be considered as limiting the invention, in a preferred form, the composition of a porous medium, preferably a polymeric hydrogel (gel), more preferably a crosslinked, polymeric hydrogel, is prepared such that it contains voids, preferably water-filtered voids. The polymeric hydrogel may be prepared from any suitable monomer or combination of monomers, preferably acrylamide monomers or monomers of acrylamide derivatives, such as N-N$^1$-methylene-bisacrylamide. The voids in the polymeric hydrogel are prepared by forming the gel around particles, preferably monodisperse particles, and subsequently etching out the particles with a material that does not impair the integrity of the gel, preferably hydrofluoric acid to etch out silica spheres. The particles, preferably silica spheres, preferably are first allowed to form by self assembly into a crystalline colloidal array prior to forming a polymeric hydrogel around them. The silica spheres are subsequently etched out with hydrofluoric acid thereby forming, preferably, a new material where a crystalline colloidal array (CCA) of water filled spherical voids occurs in a cross-linked polyacrylamide hydrogel network (vide infra).

The particles may be of any shape but are preferably spherical. The size of the particles may be any size sufficiently larger than the pore size of the porous medium so that macromolecules may experience a difference in conformational entropy between the voids and the pores. The size of the voids as determined by the size of the particles etched out is preferably chosen wherein the partitioning of selected macromolecules is such that detectably more of the macromolecule partitions in the void than in the pores, more preferably such that the ratio of macromolecule concentration in the void to macromolecule concentration in the pore is 1.5 or greater. The selection of void size for trapping selected macromolecules is preferably accomplished through application of the models discussed in the examples and elsewhere herein.

The method of separating macromolecules, selected on the basis of length, weight, or other characteristics is preferably accomplished by a method comprising, in a first step, preparing a polymeric hydrogel with spherical water voids, arranged in a crystalline colloidal array, as described above, wherein the selection of the number density, size and periodicity of the voids to preferentially trap the selected macromolecules is preferably guided by the relationships presented in the Examples below. The selected macromolecules may be any macromolecule, preferably a long chain molecule with a higher conformational entropy inside the voids compared with the pores; and in a second step, by exposing the void containing porous medium, preferably the polymeric hydrogel with a crystalline colloidal array of water-filled spherical voids, to a solution containing the selected macromolecule and other materials such that the macromolecules may enter the porous medium and partition between the voids and the pores in the porous medium, preferably by waiting a sufficient length of time for an equilibrium to become established in the movement of the macromolecules between solution voids and pores.

The separation of macromolecules between voids and pores is preferably monitored and measured by application of Bragg diffraction as illustrated in the Examples and elsewhere herein. Bragg diffraction from the PCCA of water voids is used to sensitively probe the solution refractive index changes. The intensity of the Bragg diffraction is an in-situ monitor of the difference in polymer concentrations between the polyacrylamide gel and the water spheres. Changing void size to control trapping and release of selected macromolecules is accomplished through any means of manipulating void size and shape, preferably through use of polymeric hydrogels which undergo temperature-dependant volume phase transitions more preferably by preparing polymeric hydrogels of poly-N-isopropyl-acrylamide (PNIPAM) around silica particles and subsequently etching out a new material where a crystalline colloidal array (CCA) of water-filled spherical voids occurs in a crosslinked polyacrylamide hydrogel network (vide infra).

EXAMPLE 1

Monodisperse colloidal silica spheres were obtained from Nissan Chemical Industries, Ltd. (PST-1) as a ca. 20% (by wt.) aqueous suspension (pH, 8–10) with a particle diameter of 101±6 nm as determined by transmission electron microscopy. The ionic impurities in the suspension were removed by exposure of the solution to mixed bed ion exchange resin (Bio-Rad Laboratories, AG 501-X8, 20–50 mesh). Acrylamide (At, Polysciences, Inc.), N,N'-Methylene-bisacrylamide (bis-AMD, Fluka Chemical Corp.) and photo-initiator 2,2-Diethoxyacetophenone (DEAP, Aldrich) were used directly without further purification. Narrow distribution molecular weight standards of Sodium Polystyrene Sulfonate (NaPSS, Mw/Mn ~1. 10) were purchased from Scientific Polymer Products, Inc. and Polysciences, Inc. The molecular weights quoted are the weight-average molecular weights (Mw). A Bausch & Lomb refractometer was used to measure the NaPSS solution refractive indices. A Perkin-Elmer Lambda 9 UV/VIS/NIR spectrophotometer was used to measure the NAPSS absorption spectra and to monitor the diffraction from the CCA.

Figure 2:
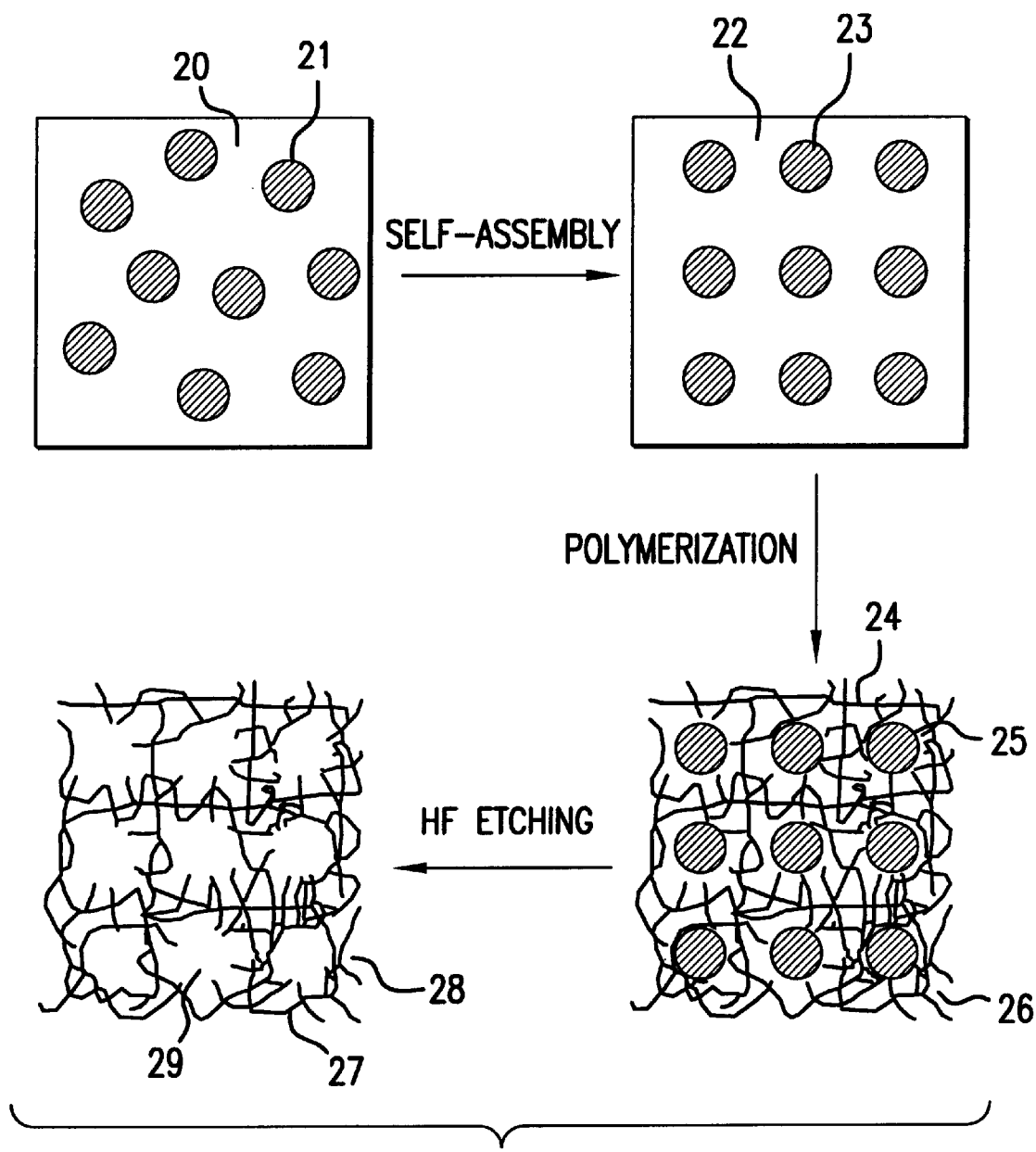
FIG. 2. Fabrication of a cubic array of spherical water voids. (a) Random silica colloid 21 aqueous 20 suspension, (b) self-assembled crystalline colloidal array (CCA) 23 in deionized water 22, (c) polyacrylamide 24 hydrogel film 26 embedded with silica CCA 25 (PCCA), (d) polyacrylamide 27 hydrogel 28 of CCA of voids 29 (HPCCA).

FIG. 2 illustrates the fabrication of a PCCA of spherical voids (HPCCA) 29. A suspension of 101 nm diameter monodisperse silica spheres was allowed to self-assemble into a CCA 23 by removing the ionic impurities with ion-exchange resin. After ion-exchange, strong iridescence from the silica CCA suspension was observed. The diffracted wavelength was controlled by varying the CCA lattice interplanar spacing, which could be continuously adjusted by varying the number density of the silica spheres in the dispersion.

The CCA structure was immobilized by polymerizing a crosslinked hydrogel 24 network around the sphere 25 array (PCCA). This methodology has also been described in detail elsewhere. See Asher, S. A., Jagannathan, S., U.S. Pat. No. 5,281,370; Asher, S. A., Holtz, J., Liu, L., Wu, Z. *J. Am. Chem. Soc.*, 1994, 116, 4997–4998; Weissman, J. M., Sunkara, H. B., Tse, A. S., Asher, S. A., *Science* 1996, 274, 959–960; Pan, G., Kesavamoorthy, R., Asher, S.A., *Phys. Rev. Lett.*, 1997, 78, 3860–3863; and Holtz, J. H., Asher, S. A., *Nature*, 1997, 389, 829–832, all incorporated herein by reference. The silica CCA aqueous suspension with the monomer AMD, the crosslinker bis-AMD, and the photo-initiator DEAP were mixed. The mixture was then injected between two quartz, plates separated by a ca. 100 μm thick spacer, and exposed to UV light by using a Mercury lamp. The acrylamide gel polymerization resulted in a crosslinked hydrogel film, where the silica CCA was permanently locked in position. A typical pre-polymerization mixture would contain a silica CCA suspension, 20% (w/w) total monomer (AMD+bis-AMD) with a 9:1 AMD to bis-AMD ratio, and 0.1% (w/w) DEAP. The final volume fraction of the silica spheres in the mixture is about 7%.

Due to the high polymer content and high crosslinker density, the resulting PCCA films were sufficiently robust to allow further chemical modification. The films were soaked in a 10% (w/w) hydrofluoric acid solution for about 5 minutes to etch out the silica colloids. After careful washing with deionized water, a HPCCA of ~100 nm diameter water-filled spherical voids 29 was created. Both diffraction (vide infra) and gravimetric analysis showed that the silica was completely removed and that the etching had little effect on the hydrogel network.

EXAMPLE 2

The intensity and wavelength of light that is Bragg diffracted by the array of water voids in the HPCCA, as prepared according to Example 1, depend upon the refractive indices of the scattering entities 29 ($n_{Void}$), the interstitial gel medium 28 pores ($n_{Medium}$), and the overall crystal ($n_{Crystal}$). These refractive indices in turn depend upon their corresponding chemical compositions. Therefore, by analyzing the diffraction profile changes, one can sensitively probe these refractive index changes. This approach, was used to monitor the NAPSS polymer concentrations in the HPCCA medium (pores) and voids.

Figure 3:
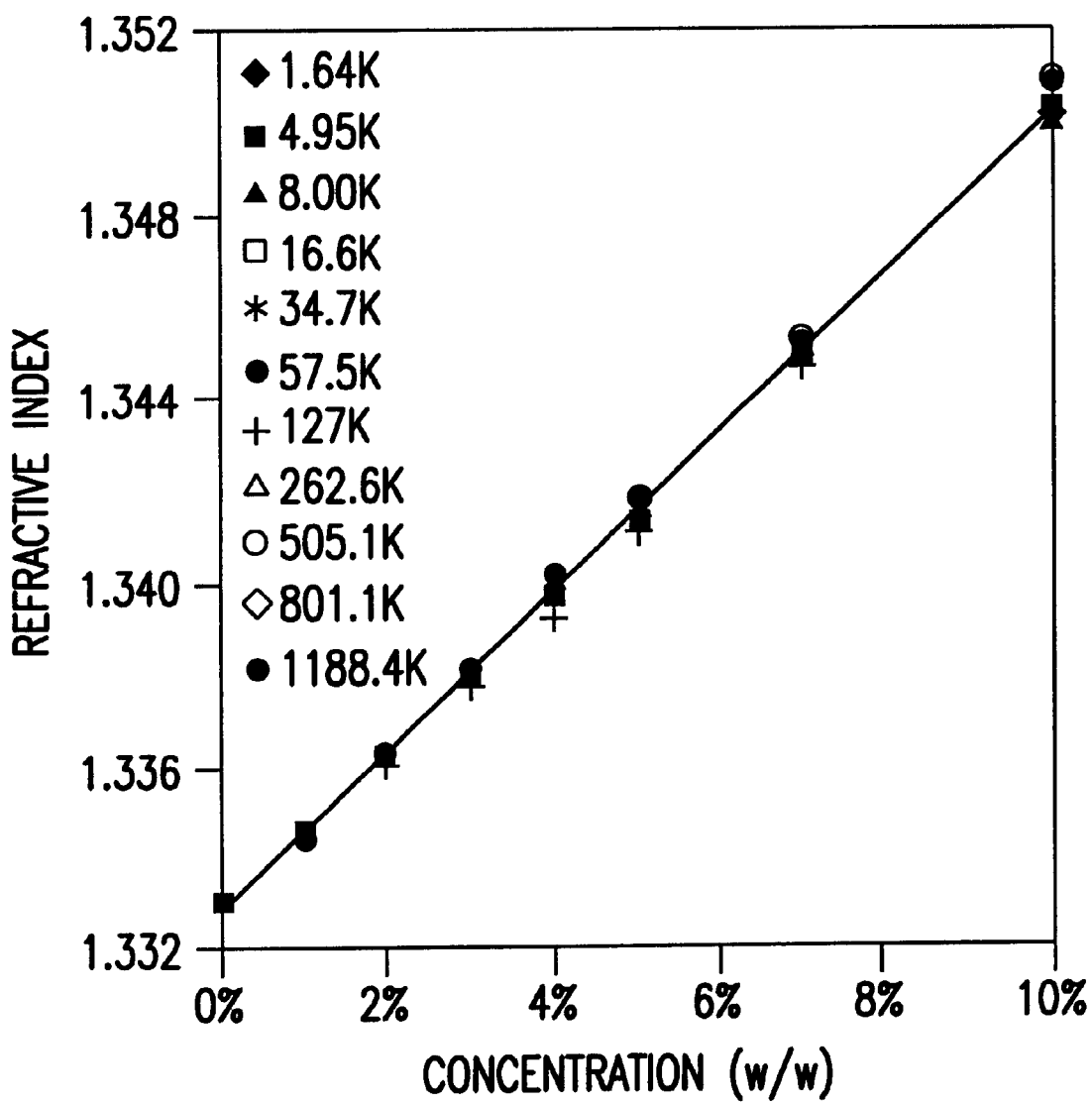
FIG. 3. Concentration dependence of the NAPSS (sodium polystyrere sulfonate) solution refractive index for all NAPSS molecular weight standards. The legend indicates the NaPSS molecular weight where K=1000 Dalton.

The following expressions relate the refractive indices of these regions to the local NaPSS solution concentrations:

$$n_{void} = n_{Water}(1-C_H) + n_{PSS}C_H \tag{1}$$

$$n_{Medium} = n_{AMD}\phi_\alpha + (1-\phi_\alpha)[n_{Water}(1-C_G) + n_{PSS}C_G] \tag{2}$$

$$n_{Crystal} = n_{Medium}(1-\phi_{Void}) + n_{Void}\phi_{Void} \tag{3}$$

where $n_{Water}$ and $n_{AMD}$ represents the refractive indices of water and AMD, $C_H$ is the NaPSS weight percent concentration in the voids, $C_G$ is the NAPSS weight percent concentration in the hydrogel medium (i.e., in the pores) with respect to the solution mass only (i.e. not including the mass of polyacrylamide network), $\phi_{Void}$ is the volume fraction of the voids in the whole system, $\phi_a$ is the volume fraction of the polyacrylamide network in the gel medium. FIG. 3 demonstrates that, in the concentration range used here, the refractive index of the NaPSS solution is linearly proportional to its weight percent concentration. Therefore, $n_{PSS}$ represents the "apparent" value of the NAPSS refractive index which is calculated from the slope to be 1.5065.

The CCA diffracted intensity and wavelength can be calculated by a model which combines dynamical x-ray diffraction theory and particle light scattering theory. See Liu, L., LI, P., Asher, S. A., *J. Am., Chem. Soc.* 1997, 119, 2729–2731; Zachariasen, W. H., *Theory of X-ray Diffraction in Crystals*, John Wiley and Sons: New York, 1946; Van Halstead, H. C. *Light Wed Scattering by Small Particles*, John Wiley and Sons: New York, 1957. The relative diffraction intensity is calculated as the ratio of the diffracted power ($P_d$) to the incident power ($P_0$) for a perfect nonabsorbing crystal:

$$\frac{P_d}{P_o} = \frac{1}{y^2 + (y^2-1)\cot^2(A\sqrt{y^2-1})} \quad \text{if } y > 1$$

$$\frac{P_d}{P_o} = \frac{1}{y^2 + (1-y^2)\coth^2(A\sqrt{1-y^2})} \quad \text{if } y < 1 \tag{4}$$

$$\frac{P_d}{P_o} = \frac{A^2}{A^2+1} \quad \text{if } y = 1$$

The measured extinction (E) is defined as:

$$E = -\text{Log}T = -\text{Log}\left(1-\frac{P_d}{P_o}\right) \tag{5}$$

where T is the transmittance.

Assuming diffraction from BCC (110) lattice planes for light at normal incidence, $$y = \frac{\Psi_0 - 2\cdot\frac{\lambda-\lambda^B}{\lambda^B}}{|\Psi_H|} \tag{6}$$

$$\lambda^B = 2n_{Crystal}d_{110} \tag{7}$$

$$A = \frac{\pi n_{Crystal} t_0 |\Psi_H|}{\lambda^B} \quad (8)$$

$$\Psi_0 = \left(\frac{n_{Crystal}}{n_{Medium}}\right)^2 - 1 \quad (9)$$

$$\Psi_H = \frac{1}{2\sqrt{2}\,\pi^2}\left[\frac{3(m^2-1)}{m^2+2}\right](\sin u - u\cos u) \quad (10)$$

$$u = \frac{2\pi n_{Crystal} D_0}{\lambda^B} \quad (11)$$

where $\lambda^B$ is the kinematic Bragg diffraction wavelength in air, $d_{100}$ is the interplanar spacing of the (110) lattice plane, $t_o$ is the crystal thickness, $m = n_{Void}/n_{Medium}$, and $D_o$ is the particle diameter.

If the hydrogel volume is constant, changes in the diffraction profile will derive only from the refractive index changes. In this case, the diffraction extinction is governed by the refractive index difference between the medium ($n_{Medium}$) and the scatterers ($n_{Void}$) while the diffracted wavelength is governed by the overall crystal refractive index ($n_{Cystal}$).

Figure 4A:
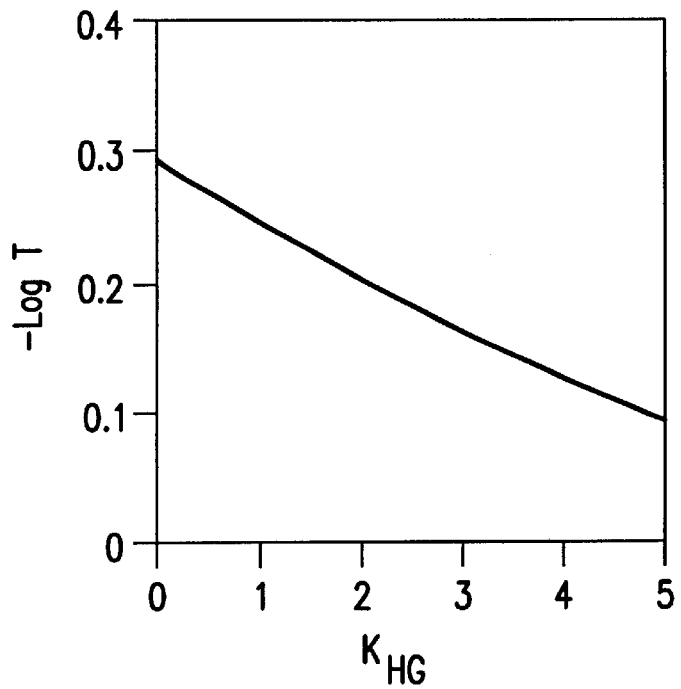
FIG. 4. Calculated diffraction change as a function of the partition coefficient $K_{HG}$ (between void and hydrogel pore) and the NAPSS concentration $C_G$. (a) Extinction (−log T) Vs. $K_{HG}$ when $C_G$=2% (w/w). (b) Extinction vs. $C_G$, when $K_{HG}$=1.
Figure 4B:
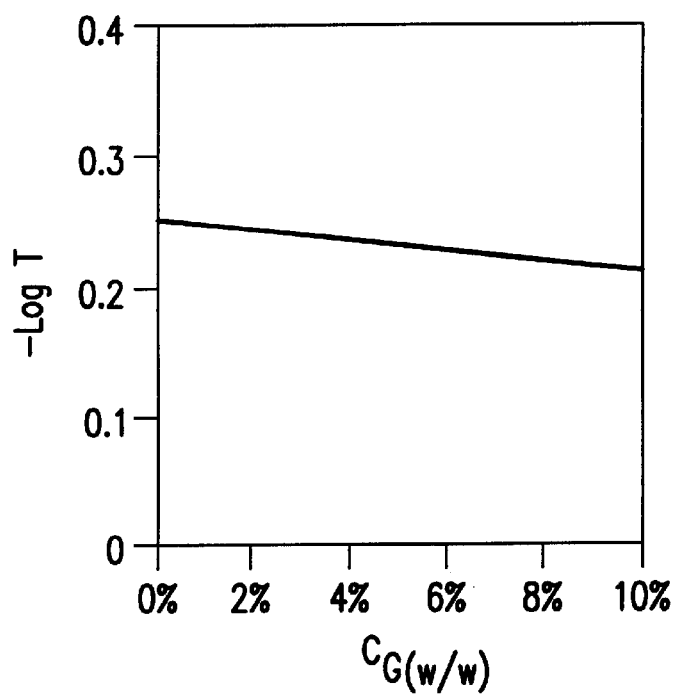

FIG. 4 shows the calculated dependence of the diffraction extinction on $C_G$ and the partition coefficient between the voids and the gel medium, $K_{HG} = C_H/C_G$. The diffraction extinction strongly depends on $K_{HG}$ because $K_{HG}$ diminishes the refractive index mismatch between the voids and the medium. If $K_{HG} = 1$ (no partitioning), the diffraction extinction only slightly decreases as $C_G$ increases.

EXAMPLE 3

Assuming that the partitioning of the NAPSS polymer chains from the reservoir solution into the porous hydrogel medium is identical in the presence or absence of the CCA, one can independently determine $C_G$ by an absorption spectroscopy. Blank hydrogel films, 200 pm thick, were made with the same composition as that of the PCCA but without the silica CCA. The absorption spectra of the blank hydrogel film in water and in NaPSS solutions of different concentrations and molecular weights were then measured. Difference absorption spectra were used to minimize the total background contributions from the scattering and absorption of the hydrogel network.

Figure 5:
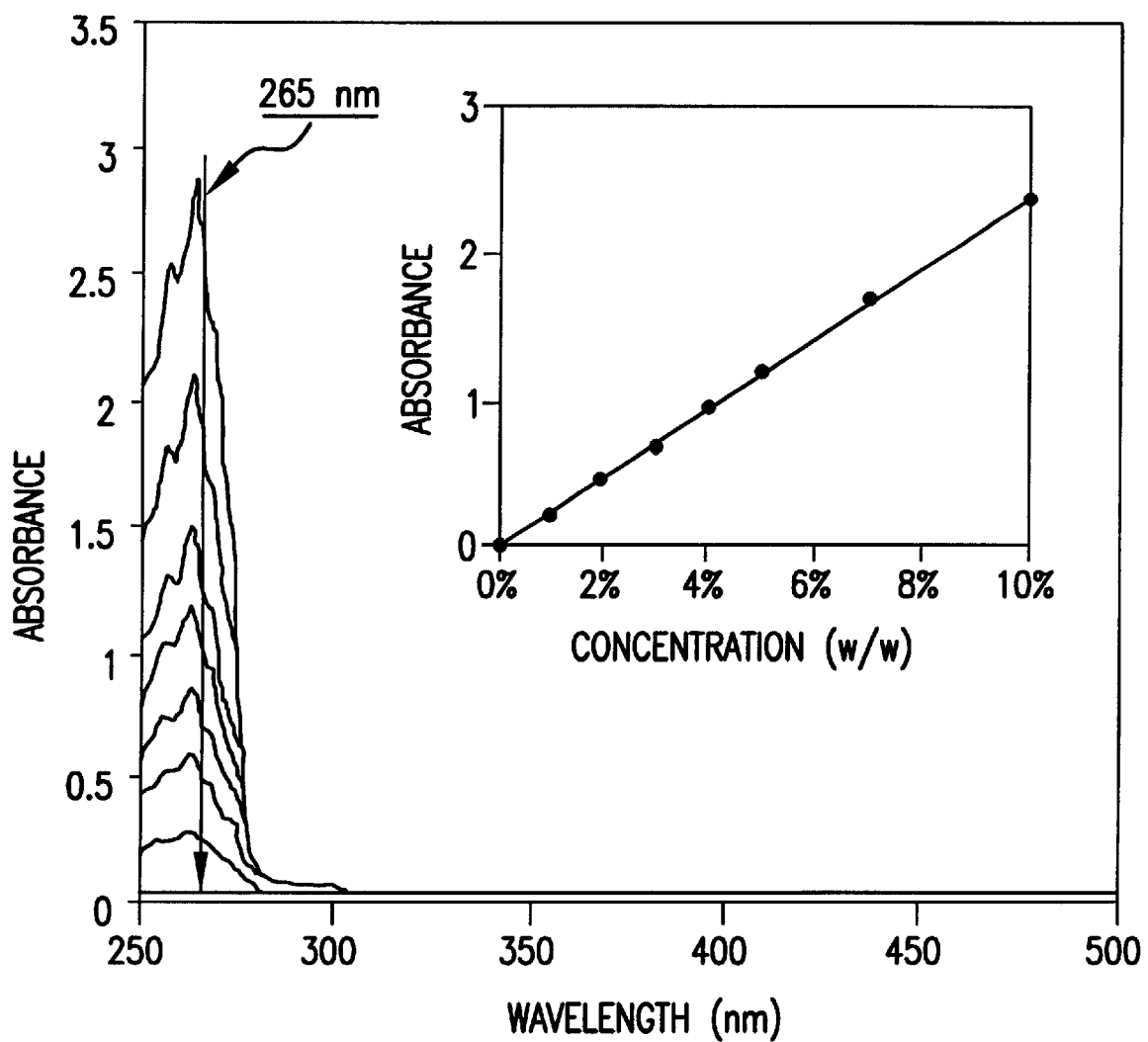
FIG. 5. Absorption spectra of PSS aqueous solutions at concentrations of 10%, 7%, 5%, 4%, 3%, 2%, 1%, and 0% by weight. The inset shows the linear correlation between the 265 nm absorbance and concentration.

FIG. 5 shows the concentration dependence of the NaPSS absorption and a typical calibration curve at 265 nm. The calibration curves are linear over the entire concentration range studied. By comparing the NAPSS absorption in the gel media and in the reservoir solution, Cg, values for each particular molecular weight and reservoir concentration were obtained.

EXAMPLE 4

Although the hydrogel films used were highly crosslinked and rigid, they still slightly changed volume for different NaPSS concentrations. This gel volume change is an important issue since it alters the HPCCA lattice parameters and the size of the voids. Consequently, the overall change in the diffraction profiles will contain the contributions not only from refractive index changes but also from gel volume changes.

One may parameterize Equations (1)–(11) with the gel swelling ratio (r), defined as the ratio of the gel volume soaked in a particular NAPSS solution over that in pure water. Assuming a homogeneous change throughout the hydrogel, the parameters $D_o$, $d_{110}$, $t_o$, and $\phi_a$ used in Equations (1)–(11) will change to $r^{1/3}D_o$, $r^{1/3}d_{110}$, $r^{1/3}t_o$, and $r^{-1}\phi_a$, respectively. Since $C_G$ is determined from the absorption measurements, there are two observables, the extinction E and the diffracted wavelength $\lambda$, which depend upon only two variables, the concentration $C_H$ (or the partition coefficient $K_{HG}$) and the swelling ratio r. Therefore, one can determine $C_H$ and r directly from the diffraction data.

The diffraction spectra of the HPCCA in pure water was experimentally measured. The HPCCA was soaked in a NaPSS solution of a particular concentration and molecular weight for three days, after which the diffraction was re-measured. The surrounding reservoir was essentially infinitely larger than the gel film (~100 μm thick discs, ~8 mm in diameter). Thus, the NaPSS concentration in the reservoir stayed constant. The soaking time was chosen to be sufficiently long that equilibrium occurred; no further diffraction changes were observed. In addition, a single HPCCA film was used throughout this study to minimize variations and errors.

Figure 6:
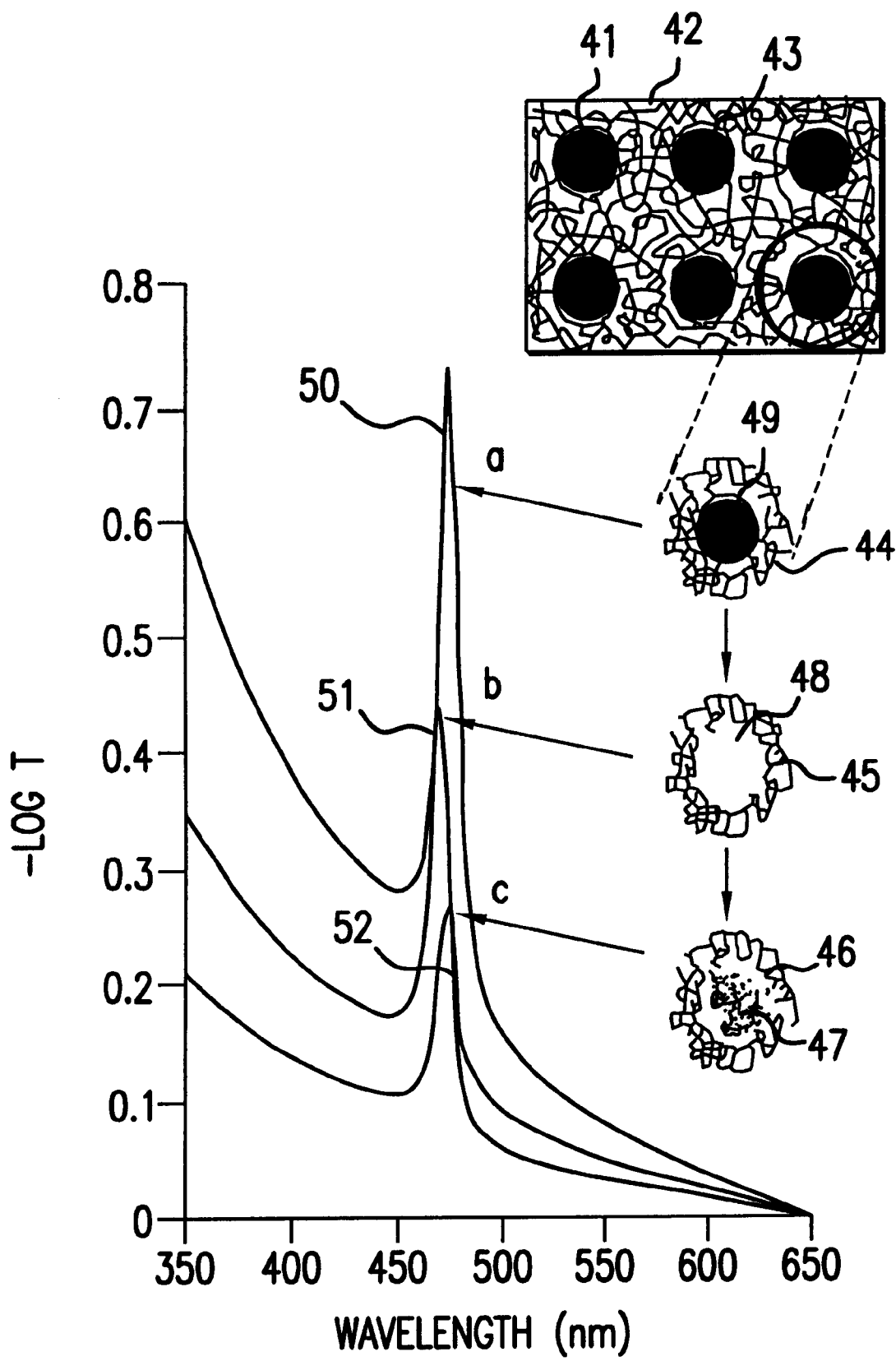
FIG. 6. Diffraction: (a) silica sphere 49 PCCA, (b) HPCCA 48, (c) NAPSS 47 filled HPCCA.

FIG. 6 shows the observed diffraction spectra for different PCCA compositions. The changes in the diffraction extinction and wavelength reflect basically the refractive index changes. As the silica spheres 43 are removed by HF etching (a→b), the PCCA diffraction extinction decreases because the refractive index mismatch between the water 48 and gel medium 45 is smaller than that between the silica 49 and the gel medium 44. The diffraction also slightly blue-shifts because $n_{Cystal}$ has decreased. As the HPCCA is soaked in the NaPSS solution (b→c), the diffraction extinction further decreases since the mismatch between $n_{Medium}$ and $n_{Void}$, is further reduced. The slight increase in $n_{Crystal}$ should red-shift the diffracted wavelength. However, the magnitude of this shift will be comparable to what would occur from gel volume changes.

Figure 7:
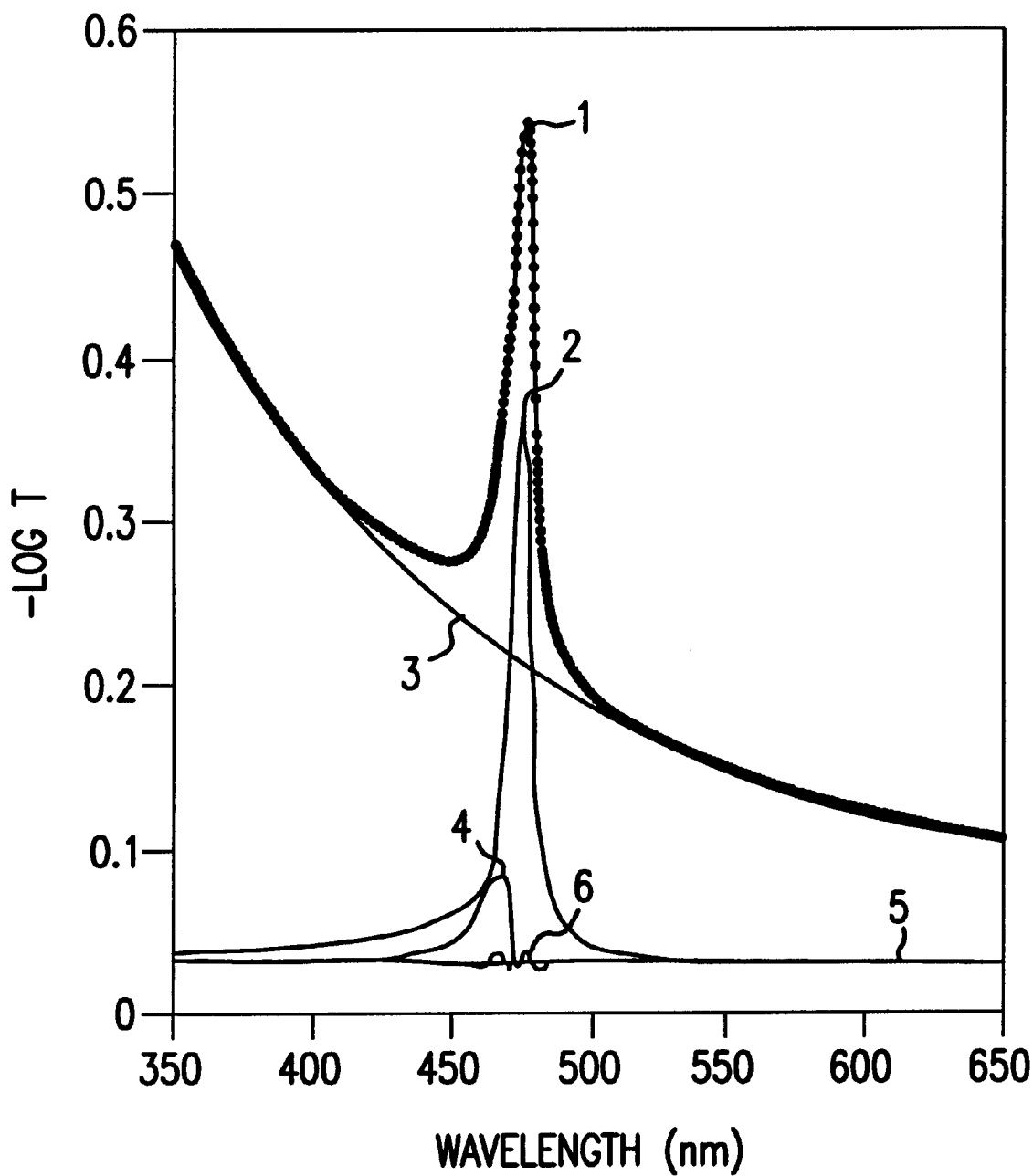
FIG. 7. Curve fitting of PCCA diffraction profile. The dotted line 1 is an experimental spectrum and the thin line is the overall curve fit. Lorentzian fit for perfect crystal diffraction 2. Gaussian fit for absorption and random scattering 3. Log normal fit for crystal defects and lattice plane misalignment 4. Baseline offset 5. Curve fitting residual 6.

To systematically measure the diffraction extinction and wavelength, a curve-fit was prepared for each of the diffraction spectra (FIG. 7). A perfect CCA will show a sharp symmetric diffraction peak. However, crystal imperfections and incident beam divergence will result in an asymmetry on the shorter wavelength side. Furthermore, the scattering from defects and the absorption of NaPSS and polyacrylamide give a background which increases as the wavelength decreases.

A Lorentzian bandshape 2 was used to model the ideal crystal diffraction and a Log-Normal peak 4 was used to model the asymmetry. A single Gaussian 3 with its maximum in the UV region was used to model the increasing background. Furthermore, a baseline offset 5 was used to account for interface reflections.

The r values were independently measured by monitoring the gel disc diameter changes using a magnifier with a contact reticle. The results agree well with those calculated from the diffraction analysis; the hydrogel linear dimension changes are all less than 1%. This agreement reinforces the reliability one can expect for the methodology used in this study.

EXAMPLE 5

Figure 8:
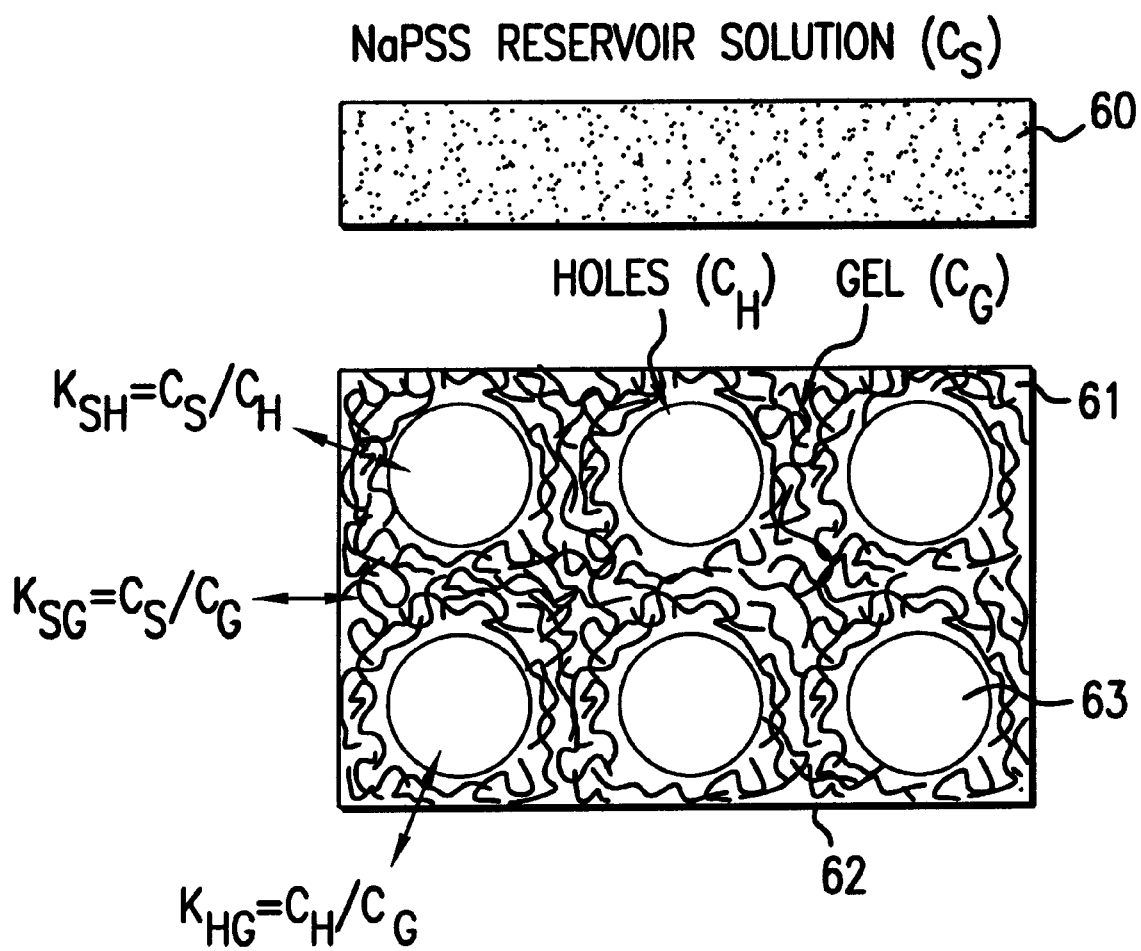
FIG. 8. Schematic of NAPSS partitioning among the three regions: the voids 63, the gel 62, and the reservoir 60. $C_H$, $C_G$, and $C_S$ are the NaPSS weight percent concentrations in the Koles, gel, and reservoir, respectively.
Figure 9A:
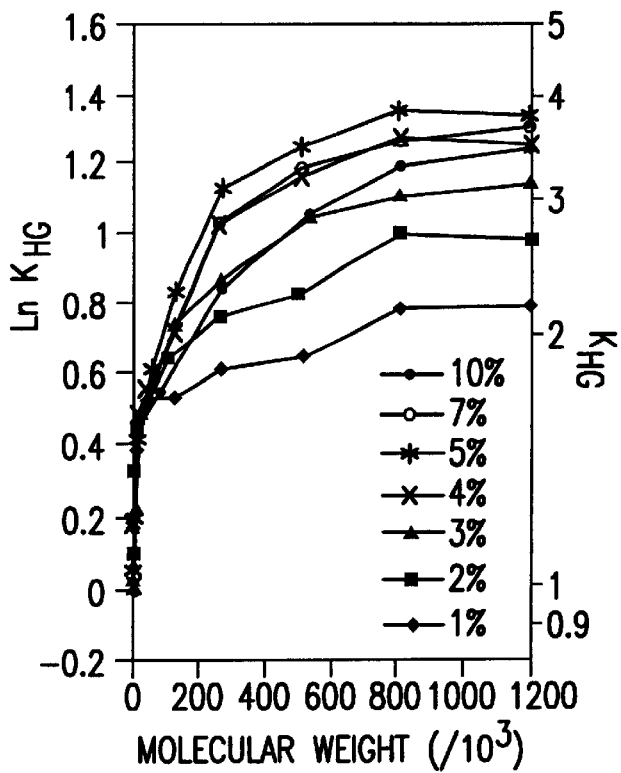
FIG. 9. Molecular weight dependence of the partition coefficients of NaPSS among the three regions. The different symbols denote the weight percentage of NaPSS in the reservoir solution. The curves connecting the points in panels (a) and (b) are used to guide the eye, while the lines in panel (c) are the linear least squares fits.
Figure 9B:
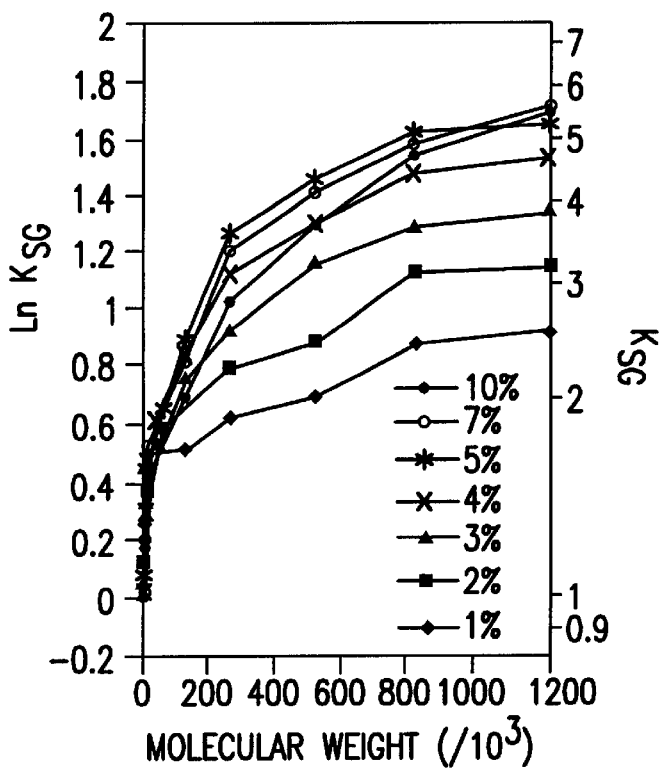
Figure 9C:
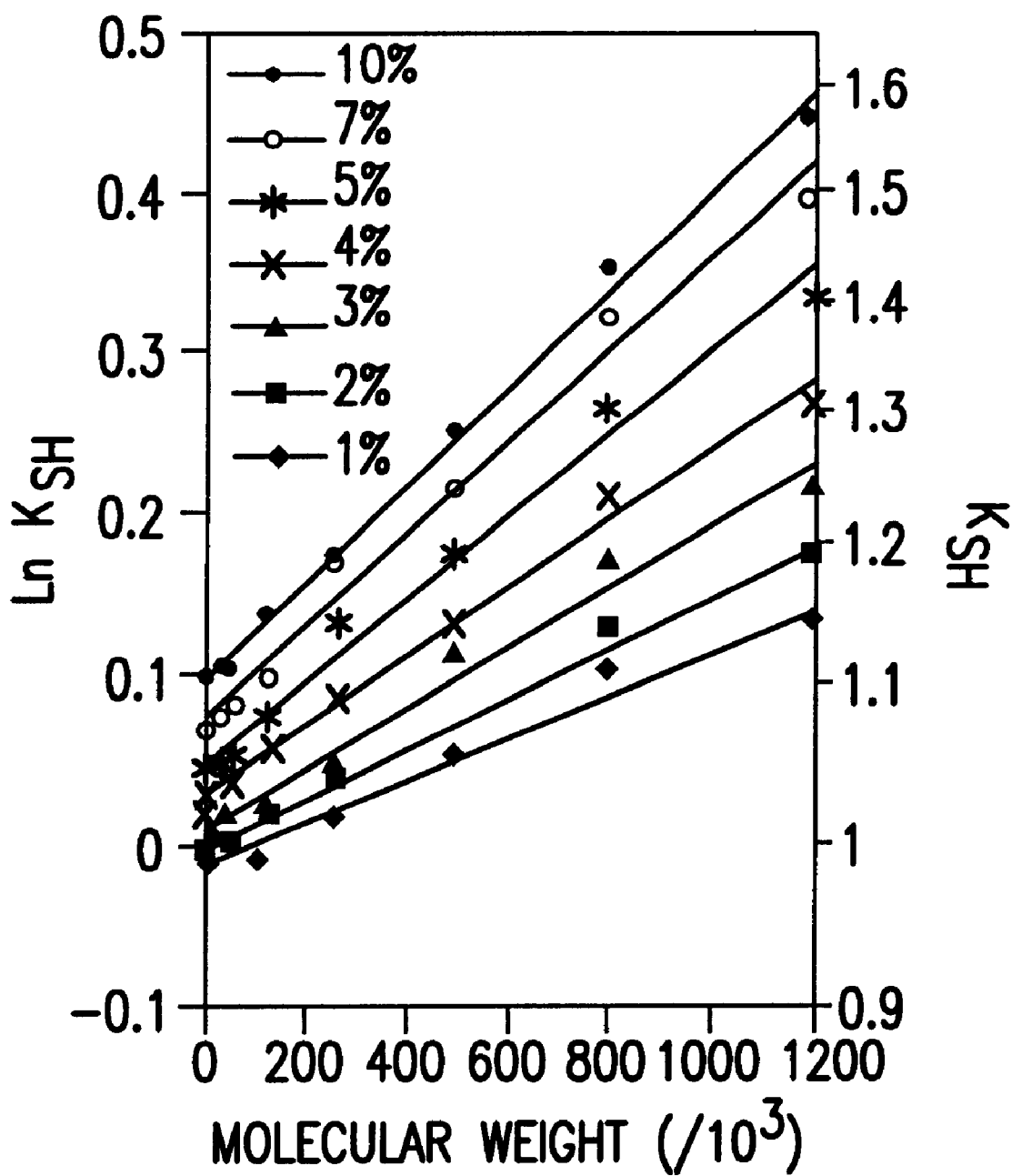
Figure 10A:
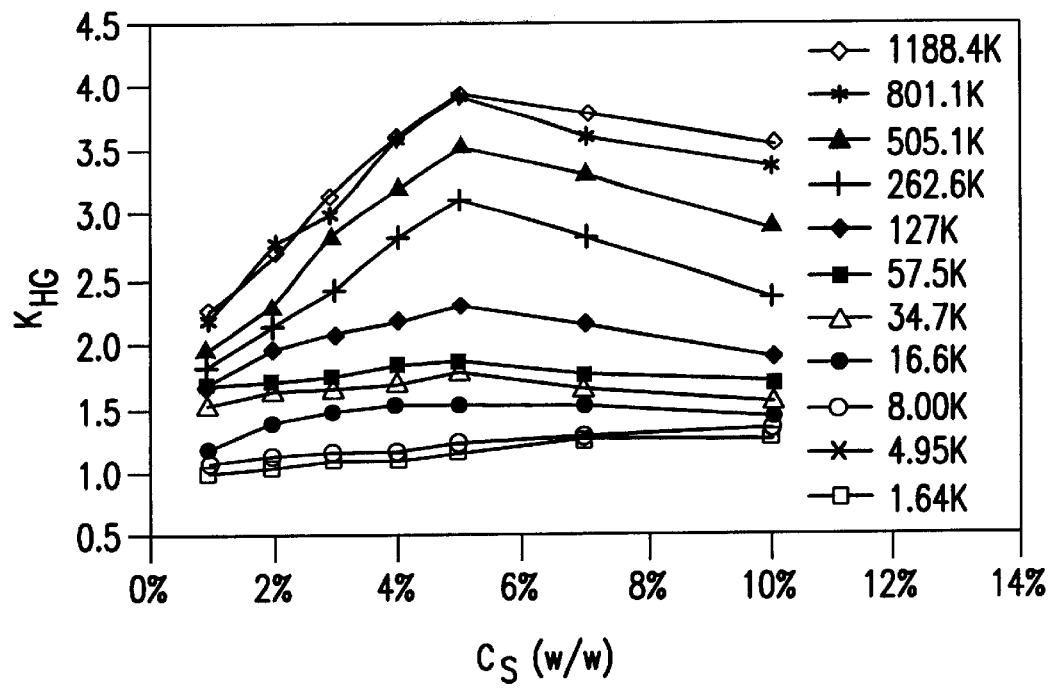
FIG. 10. Concentration dependence of the partition coefficients of NAPSS among the three regions. The different symbols indicate the different NAPSS molecular weights. The lines through the data are used to guide the eye.
Figure 10B:
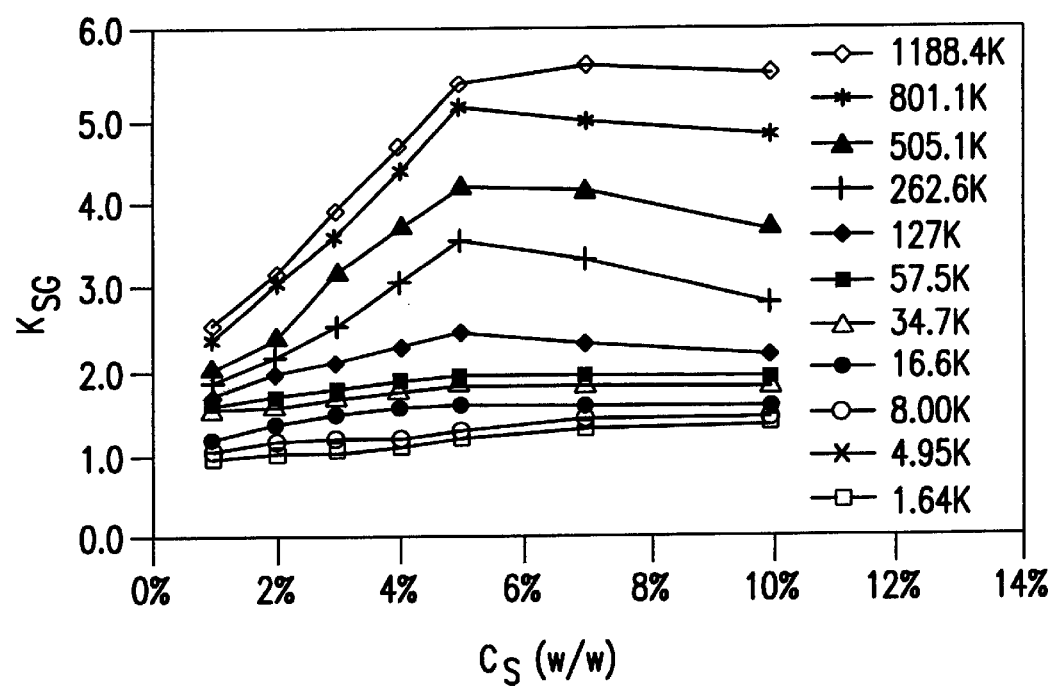
Figure 10C:
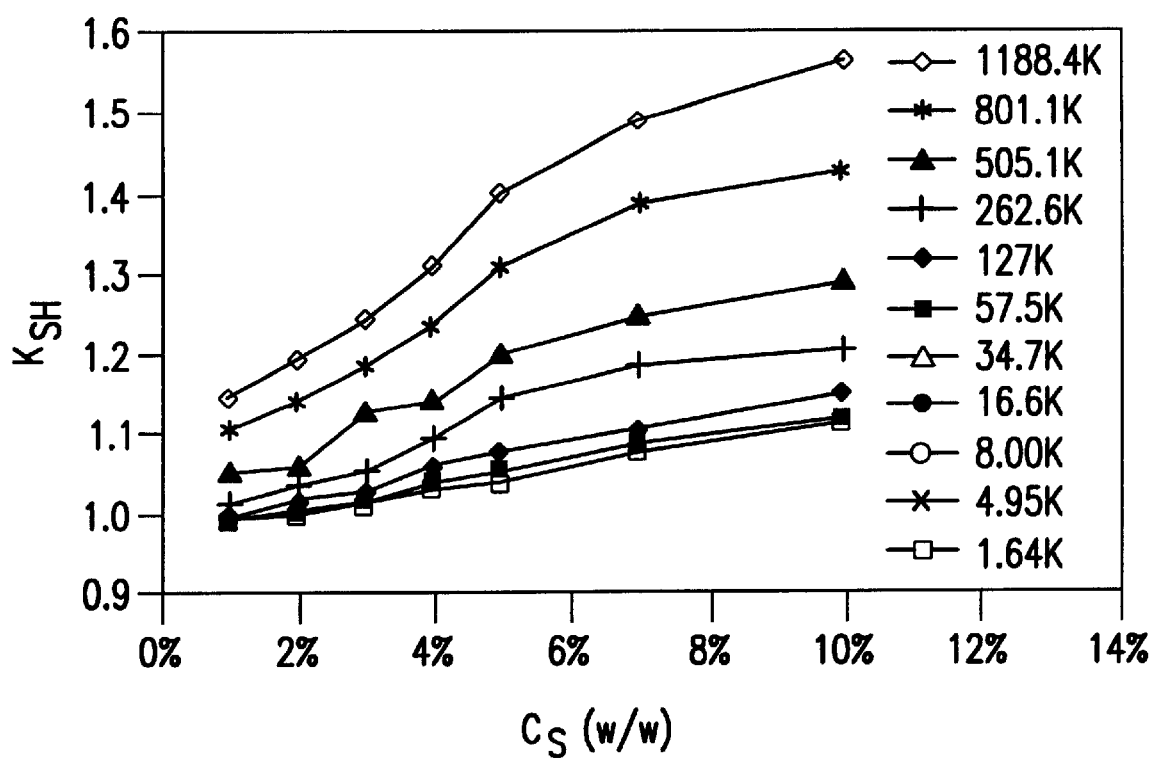
Figure 11:
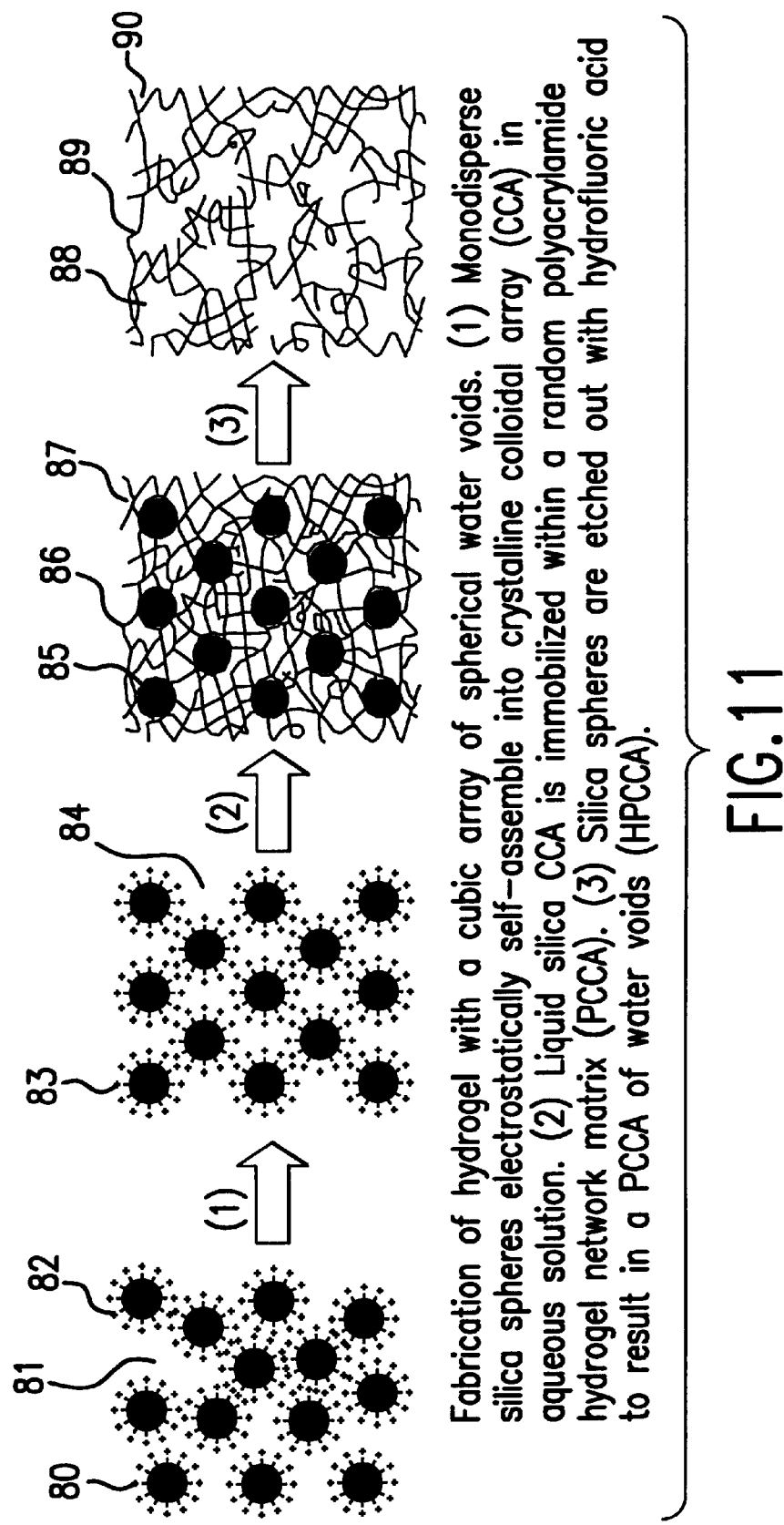
FIG. 11. Fabrication of hydrogel with a cubic array of spherical water voids. (1) An aqueous suspension of monodisperse silica spheres 80 self-assemble by electrostatic repulsion 82 into a three dimensional periodic array structure, a crystalline colloidal array (CCA), in aqueous solution 81. (2) Liquid silica CCA is immobilized within a random polyacrylamide 85 hydrogel network matrix (PCCA) 84 by polymerizing acrylamide monomers around the CCA. (3) Silica spheres 87 are etched out with hydrofluoric acid to result in a PCCA of water voids (HPCCA) 88. The PCCA hydrogel materials are sufficiently robust to allow a further chemical modification such as etching with hydrofluoric acid. These HPCCA materials Bragg diffract light in the near IR to near UV spectral regions. The diffracted intensity and wavelength depend upon the refractive indices of the scattering water voids, the interstitial gel medium, and the overall crystal system. These refractive indices in turn depend upon their corresponding chemical compositions. One can analyze the diffraction profile changes, and thus probe the chemical concentrations of interest in the HPCCA voids and medium.
Figure 12:
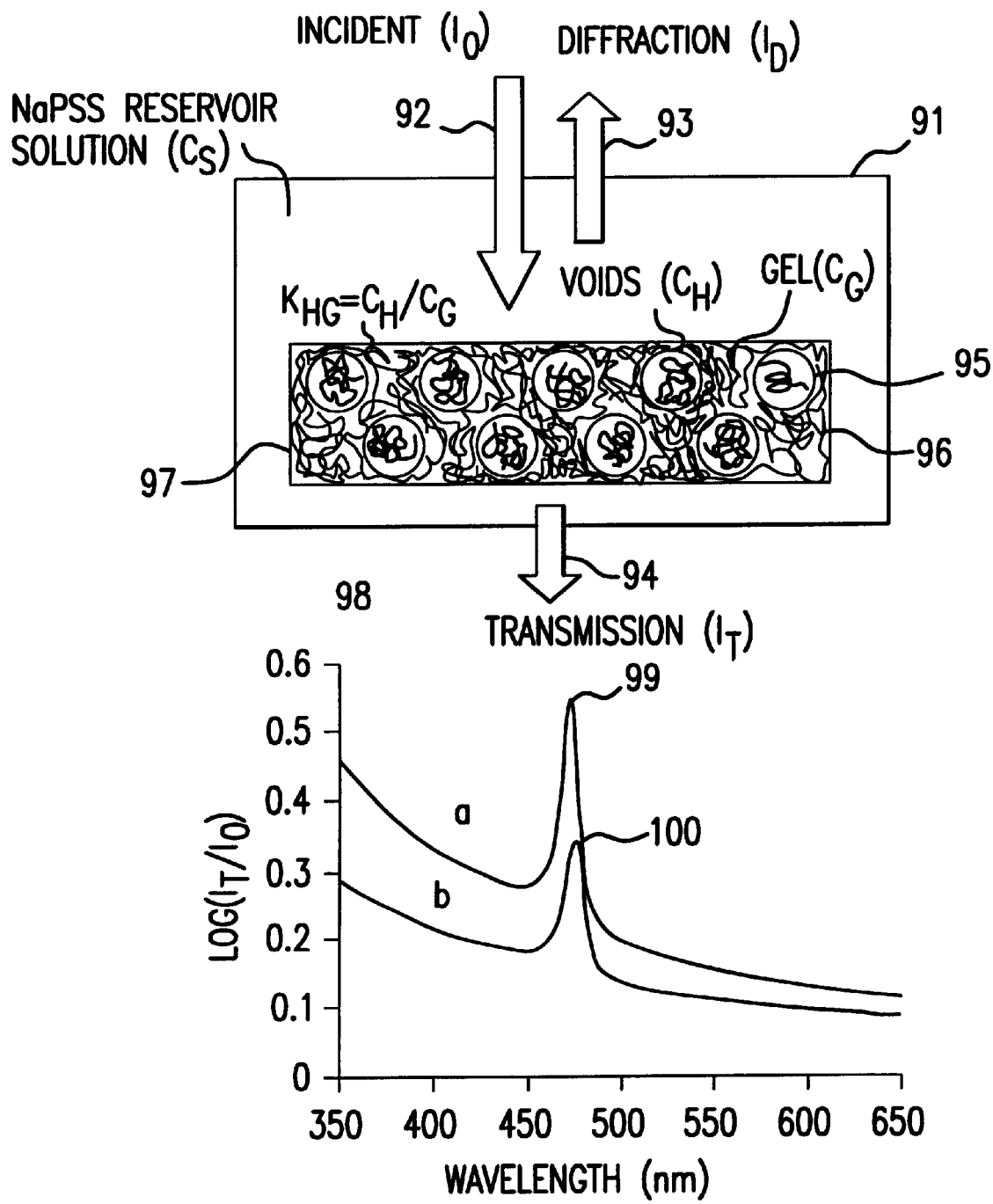
FIG. 12. Bragg diffraction probes of the chemical composition of HPCCA. 91–98: Experimental schematics. 99–100: Measured Bragg diffraction spectra from HPCCA film before 99 (a) and after 100 (b) exchange in NaPSS solution. To test the entropic trapping of flexible macromolecules in these designed voids, the HPCCA film was soaked in aqueous solutions of linear sodium polystyrene sulfonate (NaPSS) chains of different molecular weights.
Figure 13:
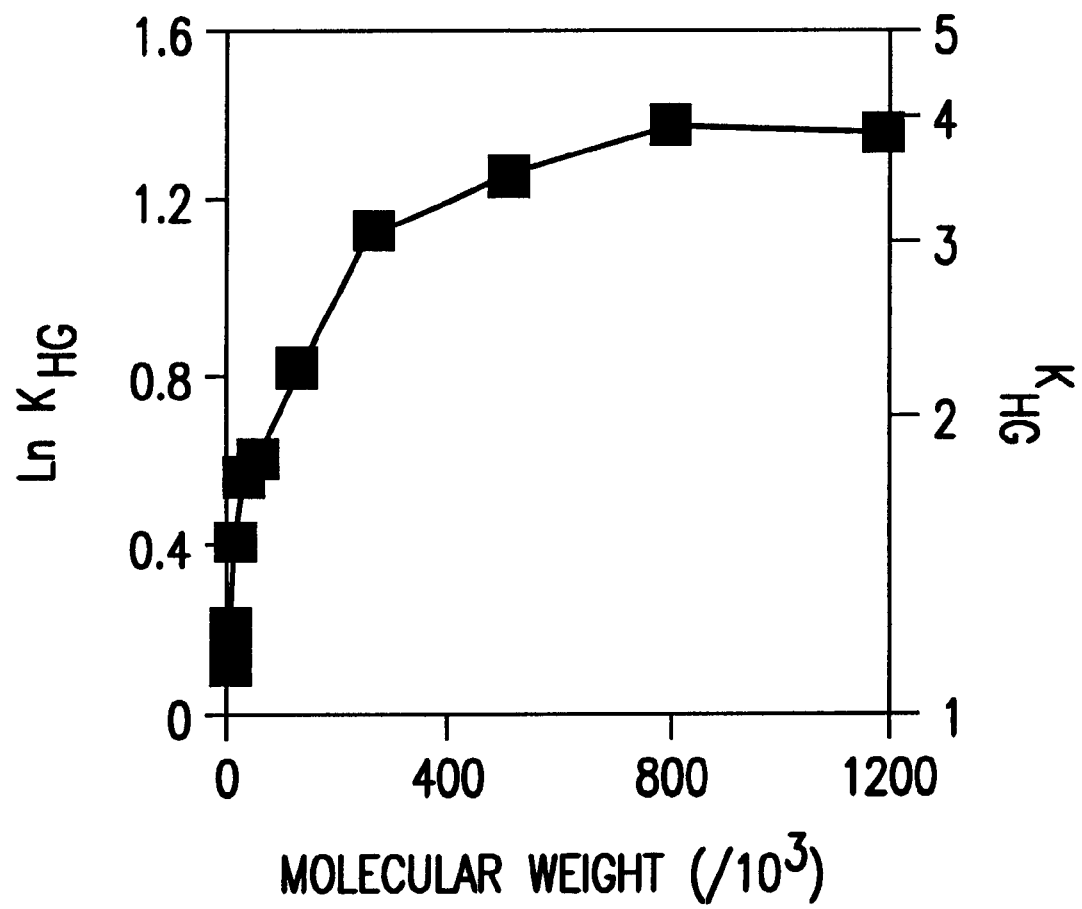
FIG. 13. Molecular weight dependence of the NAPSS partition coefficient at 5% (w/w) reservoir concentration. $K_{HG}$ is the ratio of the NaPSS weight percent concentration in the voids over that in the gel medium. These HPCCA diffraction profile changes were examined to determine the NaPSS partition coefficient ($K_{HG}$, the ratio of NaPSS concentration in the voids over that in the interstitial gel medium).

When the HPCCA film is exposed to the NAPSS reservoir, the NaPSS partitions among the three regions of different spatial constraints (FIG. 8A). The region of the voids consists of the monodisperse spherical aqueous cavities created by etching out the silica spheres. These spherical voids (presumably the same diameter as the original silica colloids (~101 nm)) occur in a cubic array lattice. The second region consists of the interstitial hydrogel space, which is a randomly inter-woven network of crosslinked polyacrylamide chains which form pores of different sizes (vide infra). This broad distribution of pores has an average diameter of several nanometers. See Righetti, P. G., *J. Chromatogr. A* 1995, 698, 3–17. The third region is the infinite NaPSS solution reservoir, which has no external constraints except excluded volume and polymer entanglements (vide infra).

Each experiment utilizes a NAPSS polymer of a defined molecular weight. $C_H$, $C_G$, and $C_S$ represent the NaPSS weight percent in the voids, the gel, and the reservoir, respectively. Note that $C_G$, is normalized to the available volume of the gel, i.e. the polyacrylamide chain volume is subtracted. The partition coefficients (the concentration ratios) are defined among the three regions as $K_{HG}$, $K_{SG}$, and $K_{SH}$ FIG. 8A).

FIG. 8B shows the dependence of the NaPSS partition coefficients on molecular weight at various reservoir concentrations ($C_S$). While the NaPSS molecular weight increases, the partition coefficients increase, and at the highest molecular weight, $K_{HG}$~4 and $K_{SG}$~6. This partitioning behavior is the first direct evidence of the entropic trapping phenomenon.

FIG. 8B shows that $\ln K_{HG}$ and $\ln K_{KG}$ initially increase rapidly and almost linearly with molecular weight, and then level off at higher molecular weights. $\ln K_{SH}$ linearly increases in the entire molecular weight range, but with a smaller slope than that of $\ln K_{HG}$ or $\ln K_{SG}$. This linear relationship between lnK and molecular weight is expected from entropic trapping theory, where the entropy term is proportional to the molecular weight (vide infra).

At the lowest molecular weight, the partition coefficients are sometimes less than one and lnK is negative. This indicates that an increase of NaPSS concentration occurs in the polyacrylamide network region; entropic trapping effects become insignificant for low molecular weight polymers, and some affinity may exist between NAPSS and polyacrylamide network.

FIG. 8C shows the NAPSS concentration dependence of the partition coefficients for different molecular weights. $K_{HG}$ shows a concentration dependence similar to $K_{SG}$. At low molecular weights, $K_{HG}$ and $K_{SG}$, only slightly increase as $C_S$ increases. In contrast, at high molecular weights, both $K_{HG}$ and $K_{SG}$ sharply increase with Cs until they reach a maximum at ~5% $C_S$, and then decrease as $C_S$ further increases. This decrease is surprising, and indicates a concentration dependence of entropic trapping. In contrast, the dependence of $K_{SH}$ on $C_S$ appears very different. $K_{SH}$ increases monotonically with $C_S$ (FIG. 8C), with a slight leveling-off for the highest molecular weights. FIG. 8C also shows that the partition coefficients rise more sharply with concentration for higher molecular weights. This indicates a larger concentration dependence of entropic trapping for higher molecular weights.

EXAMPLE 6

The partition coefficients strongly depend on the NAPSS molecular weight. This must result from an entropy effect since any enthalpic interactions between NaPSS chains or NaPSS and hydrogel network should have little molecular weight dependence. In addition, the embedded voids essentially possess the same chemical properties as the rest of gel medium except that the average pore sizes are different. The dissolved NaPSS chains should possess the same enthalpy in the gel medium and in the voids. Thus, the observed partitioning must result predominately from the polymer chain conformational entropy differences due to the different spatial constraints.

Electrostatic effects due to the NaPSS polyelectrolyte properties should not play a significant role in this partitioning process, because: (1) there are no specific electrostatic interactions between NaPSS and the polyacrylamide chains; (2) the interior intramolecular interactions of NaPSS should be the same in the gel and in the voids; (3) the electrostatic effects on the NaPSS conformation should be charge density dependent, and thus not strongly molecular weight dependent; and (4) the partitioning of NaCl was measured in the same concentration range as for NAPSS. No significant partitioning was observed for NaCl, which indicates that simple electrolytes do not selectively partition between the gel and the voids.

The configuration of a macromolecule, such as a flexible polymer chain can be treated using random walk statistics. When a polymer chain is confined to a box with an infinitely high potential energy barrier, the number of possible configurations becomes limited compared to that in free space. Thus, in the box, the polymer chain possesses less conformational entropy. The smaller the box, the less conformational freedom. Consequently, a polymer chain will preferentially partition into the largest box with the least spatial constraints.

A few groups have calculated the conformational entropy and the expected partitioning for a flexible polymer chain in confined spaces of particular sizes and shapes. See Muthulcumar, M., Baumgärtner, A., *Macromolecules*, 1989, 22, 1937–1941; Muthulcumar, M., Baumgärtner, A., *Macromolecules*, 1989, 22, 1941–1946; Casassa, E. F., *Polymer Lett.*, 1967, 5, 773–778; Casassa, E. F., Tagami, Y., *Macromolecules*, 1969, 2, 14–26; Daoud, M., De Gennes, P. G., *J Phys.* (Les Ulis, Fr.), 1977, 38, 85–93; Brochard, F., De Gennes, P. G., *J Chem. Phys.*, 1977, 67, 52–56; Daoudi, S., Brochard, F., *Macromolecules*, 1978, 11, 751–758; and De Gennes, P. G., *Scaling Concepts in Polymer Physics*, Cornell University Press: Ithaca, N.Y., 1979. These results can be generalized by the following scaling arguments. The partition coefficient $K_{ij}$ of a flexible polymer chain between two cavities i and j where cavities include both void and pore volume elements of different sizes is:

$$K_{ij} \equiv \frac{C_i}{C_j} \sim \exp\left(-\frac{\Delta G_{ij}}{k_B T}\right) \tag{12}$$

$$\Delta G_{ij} \equiv G_i - G_j \tag{13}$$

where $C_i$ and $C_j$ are the concentrations in cavities i and j, respectively, and $G_i$ and $G_j$ are the corresponding Gibbs free energies.

For an entropy dominated partitioning, where the enthalpy differences are negligible, the total free energy for a Gaussian chain at constant temperature scales as, $$G_i \sim \left(\frac{R_G}{R_i}\right)^2 \sim N\left(\frac{a}{R_i}\right)^2 \tag{14a}$$

or

-continued $$G_i \sim \left(\frac{R_G}{R_i}\right)^{\frac{1}{\nu}} \sim N\left(\frac{a}{R_i}\right)^{\frac{5}{3}} \tag{14b}$$

where N Is the number of segments (steps of the random walk) for a polymer chain, a is the Kuhn step length, ν is Flory universal exponent which is equal to ⅗ for self-avoiding chains, $R_G$ is the radius of gyration for the polymer chain, and $R_i$ is the characteristic radius of the radius of the with cavity. Muthukumar, M., Baumgärtner, A., *Macromolecules*, 1989, 22, 1937–1941; Muthukumar, M., Baumgärtner, A., *Macromolecules*, 1989, 22, 1941–1946; Casassa, E. F., *Polymer Lett.*, 1967, 5, 773–778; Casassa, E. F., Tagami, Y., *Macromolecules*, 1969, 2, 14–26; Daoud, M., De Gennes, P. G., *J Phys.* (Les Ulis, Fr.), 1977, 38, 85–93; and Brochard, F., De Gennes, P. G., *J Chem. Phys.*, 1977, 67, 52–56; Daoudi, S., Brochard, F., *Macromolecules*, 1978, 11, 751–758; De Gennes, P. G., *Scaling Concepts in Polymer Physics*, Cornell University Press: Ithaca, N.Y., 1979; and Flory, P. J., *Principles of Polymer Chemistry*; Cornell University Press: Ithaca, N.Y., 1953, 42, $G_i$ is defined with respect to the reference state where $R_i$=infinity.

Equation (14a) treats an ideal random flight chain while Equation (14b) includes self-excluded volume effects. These simple predictions are valid only for well defined rigid boundary conditions, where the cavities are sufficiently large to accommodate the entire polymer chain. However, they may not be applicable, and are certainly not quantitative, for the case of a swollen polymeric hydrogel system.

In the entropic trapping regime, statistical thermodynamics predicts that the partition coefficient from a smaller cavity to a larger one will increase with polymer molecular weight and the size difference between the two cavities, since the constrained conformational entropy scales with the polymer chain length and scales inversely with the size of the confining volume element (Equations 12–14b). These predictions qualitatively agree with the results presented in FIG. 8B. The partition coefficient values occur in the order $K_{SG} > K_{HG} >> K_{SH}$.

However, the theory further predicts that the logarithm of the partition coefficients should increase linearly with the molecular weight. FIG. 8B shows that $\ln K_{SH}$ vs. molecular weight (8B c) follows this prediction, while $\text{Ln} K_{HG}$ (8B a) and $\ln K_{SG}$ (8B b) show approximately linear behavior only for low molecular weights, but level off as the molecular weight further increases. Careful examination shows that $\ln K_{HG}$ and $\ln K_{SG}$ increase almost linearly with lnN. This indicates that $\text{Ln} K_{HG}$ and $\ln K_{SG}$ appear to increase with a fractional power of molecular weight, i.e. $\text{Ln} K_{HG}$ or $\ln K_{SG} \sim N^{1-\alpha}$, where $0 < \alpha < 1$.

Since the chain conformational entropy must scale with polymer molecular weight, this result suggests that the effective size of the crosslinked hydrogel confining volume elements depend upon molecular weight. In contrast, the theory assumes single-sized cavities, well-defined rigid boundaries, and that each cavity is large enough to contain the entire polymer chain. Thus, these conditions are not fulfilled here. In the hydrogel matrix, the water forms a continuous phase which is interwoven three dimensionally with the crosslinked polyacrylamide chains. The boundaries of the "cavities" (pores) in the hydrogel matrix are poorly defined.

A broad range of NaPSS molecular weight were analyzed with weights ranging from 1.64×10³ to 1.2×10⁶ Dalton and with radii of gyration ranging from a few nm to about 30 nm. See, Guillot, G., Léger, L., Rondelez, F., *Macromolecules*, 1985, 18, 2531–2537. In comparison, the average pore size of a hydrogel matrix is expected to be about several to 10 nm depending upon the polymer and crosslinker content. See Righetti, P. G., *J. Chromatogr. A* 1995, 698, 3–17. When a NaPSS molecule is too large to be contained in a single pore, it may simultaneously occupy two or many adjacent cavities. Each section will behave like an independent polymer of smaller molecular weight. This effect will decrease the molecular weight dependence of entropic trapping. A similar case was examined using Monte Carlo simulations by Muthukumar and co-workers, who reported that the constrained polymer conformational entropy became weakly dependent, or could even become independent of molecular weight, if the polymer molecule simultaneously occupied two or more square boxes connected by short bottle-neck channels. See, Muthukumar, M., Baumgärtner, A., *Macromolecules*, 1989, 22, 1937–1941; Muthukumar, M., Baumgärtner, A., *Macromolecules*, 1989, 22, 1941–1946

Thus, the effective size of the hydrogel matrix confining volume element is likely to be molecular weight dependent; the larger the polymer chain, the larger the space required. One can modify Equation 14 such that the size of the constraining volume element will increase with the polymer molecular weight, i.e. $R_i \sim N^{\alpha \nu}$ where $0 < \alpha < 1$. This will decrease the molecular weight dependence of the conformational entropy and decrease the slope of hnK, i.e. inK $\sim G_i \sim N^{1-\alpha}$.

The random, large pore size distribution of the hydrogel matrix also complicates our comparison with theory, since the partition coefficients are related to the statistical average of the constrained entropy over all pore sizes, which, as stated above, are molecular weight dependent. For low molecular weight polymer chains, almost all of the pores are large enough to contain the whole chain, therefore, hnKs should be a linear function of the molecular weight. However, for higher molecular weight chains, especially those which are much larger than the average pore dimension of the hydrogel medium, only a fraction of the pores are large enough to contain the whole polymer chain and contribute to the linear relationship.

For the lowest molecular weights, partition coefficients are less than unity, which is attributable to a weak affinity between the NaPSS polymer and the polyacrylamide network. This effect is more pronounced where the gel network density is higher, and could be relatively significant when the entropic trapping effect is small.

EXAMPLE 7

The concentration dependence of the partition coefficients may result from intermolecular interactions such as exclusion, entanglement, steric hindrance, and electrostatic repulsions, etc. For low molecular weight NAPSS chains, the solution concentrations are lower than the critical concentration of entanglement. The polymer molecules behave as isolated chains and little entanglement occurs. In this case, only exclusion interactions (including steric hindrance and electrostatic repulsion) occur, and thus the conformational entropy only weakly depends upon concentration.

In a cavity of certain volume, the addition of a polymer molecule into a cavity results in an intermolecular exclusion from volumes already occupied by other polymer molecules. The volume of the cavity decreases as more polymer molecules fill in. Therefore, as the polymer concentration increases, the polymer chains become more spatially constrained and their conformational entropy decreases. Since this exclusion is more significant for smaller cavities than larger ones, the partition coefficients should in general increase with concentration. This qualitatively agrees with the FIG. 8C results.

This volume exclusion effect is also molecular weight dependent. FIG. 8C shows that the higher the molecular weight, the larger the initial slope of the partition coefficient dependence on concentration. This indicates that, for the same monomer concentration, larger molecular weight polymer chains more effectively exclude each other than do those smaller molecular weight ones. This phenomenon can be rationalized by the fact that the hydrodynamic volume of a polymer chain scales as $R_3^G$, and thus as $N_{3v}$, but the mass-sum volume scales as N. For equal monomer concentrations, the ratio of volumes occupied by polymers of different molecular weight ($N_1$ and $N_2$) will be $(N_1/N_2)^{3v-1}$. Here v, the Flory universal exponent, is ~0.6 for self-avoiding random flight chains, but could be larger if the intramolecular steric hindrance and electrostatic repulsion are significant. See, Flory, P. J., *Principles of Polymer Chemistry*; Cornell University Press: Ithaca, N.Y., 1953. Therefore, for the same monomer concentrations, larger molecular weight polymer chains result in larger excluded volumes.

As the partition coefficients increase, the concentration differences between regions increase. Thus, volume exclusion becomes more important in regions of high NaPSS concentration. Furthermore, the higher concentration region may reach the entanglement regime, while the lower concentration region remains in the dilute solution regime. As the concentration and molecular weight increase, these two effects counteract entropic trapping, and could eventually dominate, to result in partition coefficient decreases. This may explain the results observed here. A similar argument was also used by Guillot, see, Guillot, G., Léger, L., Rondelez, F., *Macromolecules*, 1985, 18, 2531–2537, to interpret the concentration dependence of model membrane diffusion of polystyrene chains in ethyl acetate medium.

We claim:

1. A composition comprising a hydrogel having voids and pores wherein the size of the voids, in comparison with the pores, is selected such that macromolecules have a greater conformational entropy in the voids than in the pores.

2. The composition of claim 1 wherein the voids are filled with liquid.

3. The composition of claim 2 wherein the voids are filled with water.

4. The composition of claim 1 wherein the voids are arranged in a crystalline colloidal array.

5. The composition of claim 2 wherein the voids are spherical.

6. The composition of claim 1 wherein the hydrogel is comprised of a polymer comprising at least one acrylamide monomer.

7. The composition of claim 1 wherein the voids are monodisperse.

8. A method of preparing a hydrogel having voids and pores wherein the size of the voids, in comparison with the pores, is selected such that macromolecules have a greater conformational entropy in the voids than in the pores, comprising a step of forming a hydrogel around particles and a subsequent step of removing the particles without disrupting the hydrogel structure.

9. The method of claim 8 wherein the particles are removed by a step of etching out the particles.

10. The method of claim 9 wherein the particles are etched out with a material comprising hydrofluoric acid.

11. The method of claim 8 wherein the particles are arranged in a crystalline colloidal array prior to forming the hydrogel around them.

12. A method of partitioning macromolecules comprising a step of bringing a solution, comprising macromolecules and at least one solvent, into contact with a hydrogel material, wherein the hydrogel material has voids and pores and wherein the size of the voids, in comparison with the pores, is selected such that macromolecules have a greater conformational entropy in the voids than in the pores, and whereby the macromolecules partition preferentially in the voids.

13. The method of claim 12 wherein the hydrogel materials are arranged in a crystalline colloidal array.

14. The method of claim 13 wherein Bragg diffraction is used to monitor refractive indices of the hydrogel material and thereby monitor the partitioning.

15. The method of claim 12 wherein the void size in the hydrogel is selected to preferentially partition selected macromolecules, wherein the macromolecules are selected according to at least one of the following criteria: length, weight and conformational entropy in voids and in the hydrogel pores.

16. The method of claim 15 wherein the void size is selected such that the selected macromolecules have a greater entropy of conformation in the voids than in the hydrogel pores.

17. The method of claim 12 wherein the hydrogel is comprised of a material permitting changes in the void size.

18. The method of claim 17 wherein the hydrogel undergoes volume phase transitions by changing temperature thereby changing the void size.

19. The method of claim 18, wherein the hydrogel comprises poly-N-isopropyl-acrylamide (PNIPAM), and in a subsequent step the temperature of the material is changed, thereby altering the void size and the partitioning of the macromolecules.

20. The method of claim 12 wherein the partitioning is a step in a method of separating macromolecules.

21. The method of claim 13 wherein optical detection methods are used to monitor the partitioning.

22. The method of claim 20 wherein the partitioning is a step in a method of chromatographic separation.

23. The method of claim 20 wherein the partitioning is a step in a method of electrophoresis.

24. The method of claim 20 wherein the partitioning is a step in a method of filtration.

25. The method of claim 20 wherein the partitioning is a step in a method of extraction.

26. The method of claim 12 wherein the partitioning is a step in a method of controlling delivery of drugs.

27. The method of claim 12 wherein the partitioning is a step in a method controlling the timed-release of a material.

28. The material of claim 1 wherein the material is an element comprised in a device for separating macromolecules.

29. The material of claim 1 wherein the material is an element comprised in a semi-homogeneous catalytic reactor.

* * * * *